United States Patent
Noguchi et al.

(10) Patent No.: US 6,824,835 B2
(45) Date of Patent: Nov. 30, 2004

(54) FLEXIBLE MAGNETIC RECORDING MEDIUM

(75) Inventors: Hitoshi Noguchi, Kanagawa-ken (JP); Kazuhiro Niitsuma, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/317,077

(22) Filed: Dec. 12, 2002

(65) Prior Publication Data

US 2003/0152808 A1 Aug. 14, 2003

(30) Foreign Application Priority Data

Dec. 14, 2001 (JP) ........................................ 2001-380909
Jan. 29, 2002 (JP) ........................................ 2002-020325
Jan. 30, 2002 (JP) ........................................ 2002-021816
Jan. 30, 2002 (JP) ........................................ 2002-021817

(51) Int. Cl.$^7$ ................................................. G11B 5/84
(52) U.S. Cl. ..................... 427/547; 427/599; 427/130; 264/427; 360/16
(58) Field of Search ........................... 264/427; 360/16; 427/547, 599, 130

(56) References Cited

U.S. PATENT DOCUMENTS 6,347,016 B1    2/2002    Ishida et al.
6,613,459 B1 *  9/2003    Saito et al. .................. 428/692

FOREIGN PATENT DOCUMENTS

JP    63-183623    7/1988
JP    7-78337      3/1995

* cited by examiner

*Primary Examiner*—Stevan A. Resan
(74) *Attorney, Agent, or Firm*—Sughrue Mion, PLLC

(57) ABSTRACT

A flexible magnetic recording medium to which data is transferred by being brought into intimate contact with a master carrier which has a land/groove pattern corresponding to the data and also has a surface whose Moh's hardness is 6 to 10. The magnetic recording medium includes a substrate, a non-magnetic layer, and a magnetic layer. The non-magnetic layer and the magnetic layer are coated on the substrate in the recited order. The magnetic layer contains an abrasive comprising diamond particles whose average particle size is 0.03 to 0.5 μm. The diamond particle content of the abrasive is in a range of 0.1 to 5 wt % of ferromagnetic powder contained in the magnetic layer.

6 Claims, 2 Drawing Sheets

FLEXIBLE MAGNETIC RECORDING MEDIUM

BACKGROUND OF THE INVENTION

1. Field of the Invention

The present invention relates to high-density magnetic recording media, and particularly to a flexible magnetic recording medium that is preformatted by magnetic transfer, suitable for high-capacity magnetic disks.

2. Description of the Related Art

With an increase in the quantity of data, there is demand for a magnetic recording medium that is large in memory capacity, low in cost, and capable of high-speed access to a desired block of data. As an example of such a magnetic recording medium, there is known a high-density flexible disk. In realizing the large memory capacity, a so-called tracking servo technique, in which the width of a narrow data track is scanned accurately with a magnetic head to generate signals at a high signal-to-noise ratio (S/N ratio), plays an important role. In the tracking servo technique, a tracking servo signal, an address data signal, a reproduction clock signal, etc., are "preformatted", that is, recorded in advance, on a disk at predetermined intervals along one rotation thereof.

The magnetic head is accurately positioned over a desired data track by reading out the above-described preformatted signals and then correcting its position. Existing pre-formats are recorded on disks one sheet at a time, one track at a time, with a dedicated servo recorder.

However, the dedicated servo recorder is expensive. In addition, pre-formatting is time-consuming and therefore occupies a large part of the manufacturing cost. For the purpose of reducing the cost, methods have also been proposed, in which pre-formatting is performed no tone track at a time, but by magnetic transfer.

As disclosed in Japanese Unexamined Patent Publication No. 63(1988)-183623 and U.S. Pat. No. 6,347,016, for example, a microscopic "land/groove" pattern corresponding to data signals is formed in the surface of a substrate. The surface of a master carrier, equipped with a ferromagnetic thin film formed on at least the lands of the land/groove pattern, is brought into contact with the surface of a magnetic recording sheet or a disk which has a ferromagnetic thin film or ferromagnetic powder coated layer. In this state, by applying an AC bias magnetic field or a DC magnetic field and exciting the ferromagnetic material of the land portions, a magnetization pattern corresponding to the land/groove pattern is magnetically transferred to the magnetic recording medium.

In the above-described method, the lands of a land/groove pattern formed in the master carrier are brought into intimate contact with a magnetic recording medium to be preformatted, and at the same time, the ferromagnetic material constituting the lands is excited. In this way, a predetermined format is formed in the magnetic recording medium. Because magnetic recording can be performed statically without changing the relative position between the master carrier and the magnetic recording medium, accurate pre-formatting can be performed and the time required for pre-formatting is extremely short.

As described above, the magnetic transfer is advantageous in that it can perform pre-formatting accurately and in a short time. However, if magnetic transfer is performed repeatedly on a magnetic recording medium, the master carrier surface will be flawed by an abrasive contained in the magnetic recording medium. As a result, the quality of recorded signals will be degraded and it will become difficult to perform recording on a plurality of magnetic recording disks or a long tape length. Since the abrasive in the magnetic recording medium is indispensable to maintain the high electromagnetic transfer characteristic and durability of the magnetic recording medium, the above-described problem cannot be overcome by simply reducing the quantity of the abrasive.

In addition, if magnetic transfer is performed repeatedly on magnetic recording mediums, there is another problem that the master carrier surface will be gradually corroded by vinyl chloride, etc. contained in the magnetic recording medium and therefore the quality of signals recorded will be degraded.

To enhance the quality of transfer in the above-described magnetic transfer, it is necessary to make the gap between the master carrier and the magnetic recording medium uniform. However, as it is difficult to keep the gap uniform over the entire surface, the master carrier and the slave medium are usually brought into intimate contact with each other. Even in this case, it is extremely important to keep the intimate contact uniform over the entire surface. If there is an imperfect contact portion, magnetic transfer will not be performed on that portion. If magnetic transfer is not performed, then signal dropouts will occur in the magnetic data transferred to the magnetic recording medium and therefore signal quantity will be degraded. In the case where the signals recorded are servo signals, the tracking function is not sufficiently obtained. As a result, there is a problem that reliability will be reduced.

The contact between the magnetic recording medium and the master carrier can be enhanced by pressing the entire back surface of the master carrier with uniform pressure by elastic means (see Japanese Unexamined Patent Publication No. 7(1995)-78337)

The master carrier is usually generated by a lithographic method, a stamper method, etc. Since the master carrier generated by these methods has a warp of about a few 10 micrometers to a few 100 micrometers, it is difficult to apply uniform pressure to the entire surface. Therefore, it is contemplated that it is difficult to apply uniform pressure to the entire surface by simply removing a warp in the master carrier.

In addition, if a magnetic disk is rotated at high speeds, and a magnetic head is repeatedly positioned over the required data track on the magnetic disk over a predetermined time (e.g., 200 to 300 hours in a high-temperature environment), then there are cases where flaws will occur in the disk surface, data cannot be recorded or reproduced, and errors will occur. One of the causes of flaws in the magnetic disk surface lies in a reduction in the performance of a lubricant for the magnetic disk due to volatilization. That is, a lubricant is indispensable for magnetic disks, because it has a great influence on the durability and flaw-resisting property of the magnetic disks.

However, when tracking servo signals, an address data signal, a reproduction clock signal, etc., are prerecorded on a magnetic disk by a master carrier (magnetic transfer), a lubricant for the magnetic disk is accumulated on the master carrier and makes it difficult to magnetically transfer the signals to the magnetic disk.

That is, while a lubricant is required to maintain the durability and flaw-resisting property of the magnetic disk, the lubricant is obstructive when predetermined signals are prerecorded on a great number of magnetic disks by a master carrier.

SUMMARY OF THE INVENTION

The present invention has been made in view of the above-described circumstances.

Accordingly, a first object of the present invention is to provide a flexible magnetic recording medium that is capable of increasing the number of magnetic transfer cycles, by preventing flaws from occurring in the surface of a master carrier while maintaining the high electromagnetic transfer characteristics and durability of the magnetic recording medium.

A second object of the invention is to provide a flexible magnetic recording medium that is capable of increasing the number of magnetic transfer cycles, by preventing the surface of a master carrier from being corroded.

A third object of the invention is to provide a flexible magnetic recording medium which is capable of reducing signal dropouts during magnetic transfer and enhancing signal quality, by making the intimate contact between the recording medium and a master carrier sufficient.

A fourth object of the invention is to provide a flexible magnetic recording medium and a fabrication method thereof which are capable of assuring the long-term stability of the quality of recorded signals, by preventing a lubricant for the recording medium from being transferred to a master carrier where predetermined signals are prerecorded by magnetic transfer, while maintaining the durability and flaw-resisting property of the magnetic recording medium.

To achieve the aforementioned objects and in accordance with the present invention, there is provided a first flexible magnetic recording medium to which data is transferred by being brought into intimate contact with a master carrier which has a land/groove pattern corresponding to the data and also has a surface whose Moh's hardness is 6 to 10. The magnetic recording medium comprises a substrate, anon-magnetic layer, and a magnetic layer. The non-magnetic layer and the magnetic layer are coated on the substrate in the recited order. The magnetic layer contains an abrasive comprising diamond particles whose average particle size is 0.03 to 0.5 $\mu$m. The diamond particle content of the abrasive is in a range of 0.1 to 5 wt % of ferromagnetic powder contained in the magnetic layer.

In the first flexible magnetic recording medium of the present invention, the average particle size of the diamond particles is in a range of 0.03 to 0.5 $\mu$m and preferably in a range of 0.05 to 0.3 $\mu$m. The diamond particle content is in a range of 0.1 to 5 wt % of the ferromagnetic powder and preferably in a range of 0.3 to 3 wt %.

Further in accordance with the present invention, there is provided a second flexible magnetic recording medium to which data is transferred by being brought into intimate contact with a master carrier which has a magnetic pattern corresponding to the data. The second magnetic recording medium comprises a non-magnetic substrate, a non-magnetic layer, and a magnetic layer. The non-magnetic layer and the magnetic layer are formed on the substrate in the recited order. The magnetic layer includes polyurethane resin which contains in a range of 0.05 to 0.7 meq/g at least one kind of polar group selected from the group consisting of —$SO_3M$, —$OSO_3M$, —$P=O(OM)_2$, —$O$—$P=O(OM)_2$, and —$COOH$ (where M represents a hydrogen atom, alkali metals, or an ammonium salt). The polyurethane resin content is 60 wt % or greater of the quantity of all resins in the magnetic layer.

In the second flexible magnetic recording medium of the present invention, the aforementioned one kind of polar group is in a range of 0.01 to 0.7 meq/g, preferably in a range of 0.1 to 0.5 meq/g, and further preferably in a range of 0.2 to 0.4 meq/g.

The aforementioned polyurethane resin content is 60 wt % or greater of the quantity of all resins in the magnetic layer and preferably 70 wt % or greater. It may be 100 wt %. That is, all resins in the magnetic layer may be polyurethane resin.

Further in accordance with the present invention, there is provided a third flexible magnetic recording medium to which data is transferred by being brought into intimate contact with a master carrier which has a land/groove pattern corresponding to the data. The third magnetic recording medium comprises a non-magnetic substrate, and a non-magnetic layer and a magnetic layer coated on the substrate in the recited order. The relationship between the Moh's hardness (X) of the surface of the master carrier and the Knoop hardness (Y kg/mm$^2$) of the surface of the magnetic recording medium is represented as $1 \leq Y/X \leq 7$.

The Knoop hardness of the surface of the magnetic recording medium is measured by a Knoop hardness test. When the length of the longer diagonal of a rhombic indentation produced with a load of P kg by a diamond indentator is designated as l, the Knoop hardness is expressed as 14.22 P/l$^2$ (kg/mm$^2$).

Further in accordance with the present invention, there is provided a fourth flexible magnetic recording medium to which data is magnetically transferred by being brought into intimate contact with a master carrier which has a land/groove pattern corresponding to the data. The fourth magnetic recording medium comprises a substrate, and a non-magnetic layer and a magnetic layer coated on the substrate in the recited order. In the fourth magnetic recording medium, a first coating solution for forming the non-magnetic layer contains a first lubricant in a range of 1 to 20 wt % of non-magnetic powder contained in the non-magnetic layer. A second coating solution for forming the magnetic layer contains a second lubricant which is ¼ or less of the first lubricant in quantity. The first and second lubricants are liquids at a temperature at which the magnetic transfer is performed.

The first lubricant and the second lubricant may be the same or different in kind, if they are liquids at a temperature at which the magnetic transfer is performed.

The first lubricant is in a range of 1 to 20 wt % of the non-magnetic powder, preferably in a range of 2 to 15 wt %, and further preferably in a range of 4 to 10 wt %. The second lubricant is ¼ or less of the first lubricant in quantity and preferably ¹⁄₁₀ or less in quantity.

Further in accordance with the present invention, there is provided a method of fabricating a flexible magnetic recording medium, which comprises (1) a step of stacking a non-magnetic layer which contains in a range of 1 to 20 wt % of non-magnetic powder a first coating solution being a liquid at a temperature at which magnetic transfer is performed, and a magnetic layer which contains a second coating solution being ¼ or less of the first lubricant in quantity and also being a liquid at the temperature, on a substrate in the recited order; (2) a step of bringing a master carrier, which has a land/groove pattern corresponding to data to be transferred, into intimate contact with the stacked body to transfer the data to the stacked body; and (3) a step of treating the stacked body with heat.

In the above-described first flexible magnetic recording medium, the magnetic layer contains an abrasive comprising diamond particles whose average particle size is 0.03 to 0.5 $\mu$m. The diamond particle content of the abrasive is in a range of 0.1 to 5 wt % of ferromagnetic powder contained in the magnetic layer. The first flexible magnetic recording medium has the following advantages: the surface of the master carrier is prevented from being flawed by the magnetic recording medium during magnetic transfer; the long-term stability of the quality of signals recorded on the magnetic recording medium can be achieved; and the running durability of the magnetic recording medium can be maintained.

In the above-described second flexible magnetic recording medium, the magnetic layer includes polyurethane resin which contains in a range of 0.05 to 0.7 meq/g at least one kind of polar group selected from the group consisting of —$SO_3M$, —$OSO_3M$, —$P=O(OM)_2$, —O—$P=O(OM)_2$, and —COOH (where M represents a hydrogen atom, alkalimetals, or an ammonium salt). The polyurethane resin content is 60 wt % or greater of the quantity of all resins in the magnetic layer. Therefore, the master carrier surface can be prevented from being corroded during magnetic transfer by a chemical substance, which can be the cause of corrosion, such as vinyl chloride contained in the magnetic recording medium. As a result, the long-term stability of the quality of signals recorded on the magnetic recording medium can be achieved.

In the above-described second flexible magnetic recording medium, polyurethane resin with a high polar group content is employed a predetermined quantity or greater. Therefore, the dispersion of magnetic powder in the magnetic layer can be enhanced, and uniform dispersion can be achieved. As a result, it becomes possible to obtain a sufficient S/N ratio.

In the above-described third flexible magnetic recording medium, the relationship between the Moh's hardness (X) of the surface of the master carrier and the Knoop hardness (Y kg/mm$^2$) of the surface of the magnetic recording medium is represented as $1 \leq Y/X \leq 7$. Therefore, magnetic transfer can be performed while holding a sufficient intimate contact between the master carrier and the magnetic recording medium. As a result, signal dropouts can be prevented from occurring in magnetic data transferred to the magnetic recording medium, and signal quantity can be enhanced.

In the above-described fourth flexible magnetic recording medium, the first coating solution for forming the non-magnetic layer contains a first lubricant in a range of 1 to 20 wt % of non-magnetic powder contained in the non-magnetic layer. The second coating solution for forming the magnetic layer contains a second lubricant which is ¼ or less of the first lubricant in quantity. Therefore, the second lubricant can be prevented from being transferred to the master carrier, and the long-term stability of the quality of signals recorded on the magnetic recording medium can be achieved. In addition, the first and second lubricants are liquids at a temperature at which the magnetic transfer is performed. Therefore, the lubricant moves gradually from the non-magnetic layer to the magnetic layer after magnetic transfer and during rotation of the magnetic recording medium. As a result, it becomes possible to maintain the durability and flaw-resisting property of the magnetic recording medium.

In the above-described fabrication method, the non-magnetic layer and the magnetic layer are stacked on a substrate in the recited order. Then, a master carrier, which has a land/groove pattern corresponding to data to be transferred, is brought into intimate contact with the stacked body to transfer the data to the stacked body. Next, the stacked body is treated with heat. Therefore, since the lubricant in the non-magnetic layer can be efficiently moved to the magnetic layer (overlying layer), the durability and flaw-resisting property of the magnetic recording medium can be further enhanced.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
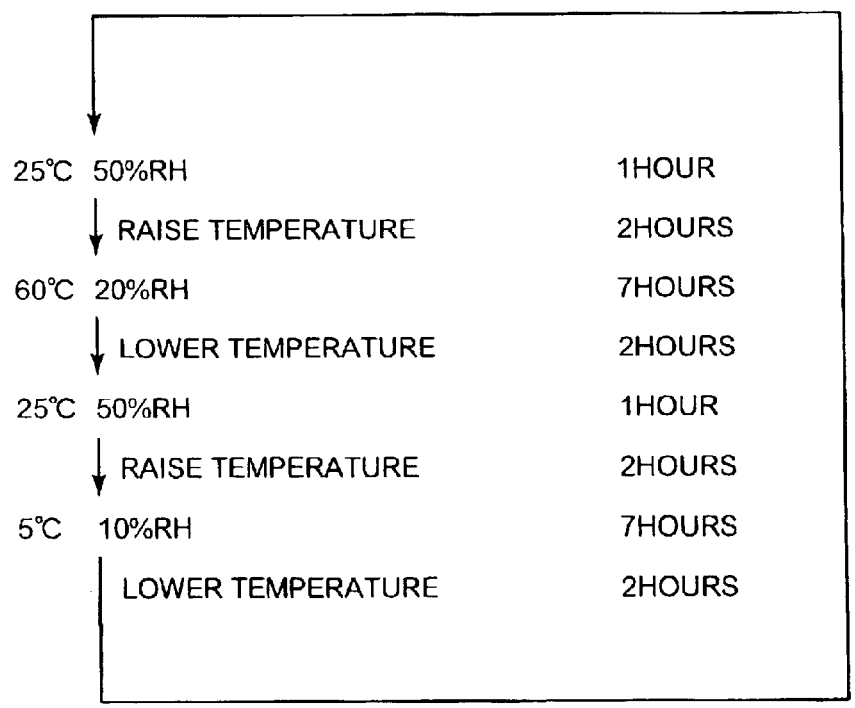
FIG. 1 is a diagram showing a thermocycle flow.

Embodiments of the present invention will hereinafter be described in detail with reference to the attached drawings.

A first flexible magnetic recording medium is a flexible magnetic recording medium to which data is transferred by being brought into intimate contact with a master carrier which has a land/groove pattern corresponding to the data and also has a surface whose Moh's hardness is 6 to 10. The magnetic recording medium has a coating, which includes a non-magnetic layer and a magnetic layer. The magnetic layer contains an abrasive comprising diamond particles whose average particle size is 0.03 to 0.5 µm. The diamond particle content of the abrasive is in a range of 0.1 to 5 wt % of ferromagnetic powder contained in the magnetic layer.

The use of a small quantity of diamond particles renders it possible to assure the durability of a magnetic recording medium and can also reduce an adverse influence with respect to magnetic material cohesion and other defects in the magnetic layer. Consequently, noise can be considerably improved and the output can be slightly increased. Hence, a magnetic recording medium with an excellent high-density recording characteristic and running durability can be easily obtained.

The average particle size of the diamond particles contained in the magnetic layer is in a range of 0.03 to 0.5 µm and preferably in a range of 0.05 to 0.3 µm. If the average particle size is less than 0.3 µm, then the effect of durability enhancement with respect to the addition of diamond particles is reduced. On the other hand, if it is 0.5 µm or greater, the master carrier is easily flawed during magnetic transfer. For these reasons, it is difficult to achieve the long-term stability of the quality of signals recorded on a magnetic recording medium, and in addition, noise becomes high. In the present invention, the diamond particle size refers to the maximum size of each diamond particle. The average particle size means the average of the measured values of 500 particles extracted randomly from a transmission electron microscope (TEM) image The diamond particle content is in a range of 0.1 to 5 weight percent (wt %) of the ferromagnetic powder and preferably in a range of 0.3 to 3 wt %. If it is less than 0.1 wt %, then it is difficult to assure durability. On the other hand, if it exceeds 5 wt %, the master carrier is easily flawed during magnetic transfer. For these reasons, it is difficult to achieve the long-term stability of the quality of signals recorded on a magnetic recording medium, and in addition, durability is reduced. Furthermore, the effect of reducing noise is lessened.

In a preferred example of the distribution of diamond particles, the number of particles whose size is 200% or greater of the average particle size is 5% or less of the total number of diamond particles. The number of particles whose size is 50% or less of the average particle size is 20% or less of the total number of diamond particles. The maximum value of a diamond particle size used in the present invention is normally 3.00 µm and preferably about 2.00 µm. The minimum value is normally 0.01 µm and preferably about 0.02 µm.

The measurement of the particle distribution is made by calculating the number of particles with an average particle size as reference when measuring the above-described particle sizes. The distribution of diamond particles also flaws the master carrier surface during magnetic transfer, and has influence on durability and noise. If the particle distribution is wider than the above-described range, then an effect equivalent to the aforementioned average particle size will be shifted. That is, if there are a great number of particles that are too large in size, then the master carrier will be easily flawed during magnetic transfer, it will become difficult to achieve the long-term stability of the quality of signals recorded on a magnetic recording medium, noise will be increased, and a magnetic head will be flawed. Conversely, if there are a great number of particles that are too small in size, then the abrasive effect will become insufficient. In addition, when the particle distribution is extremely narrow, the price of diamonds becomes higher and therefore the above-described range is advantageous in terms of cost. Diamond particles have high hardness. If diamond particles whose distribution is sharp are used, the same abrasive effect can be obtained with diamond particles smaller in quantity than a conventional abrasive. Therefore, diamond particles are advantageous from the viewpoint of noise.

The diamonds that are employed in the present invention may be natural diamonds or artificial diamonds. However, considering cost, cheap artificial diamonds are preferred. Examples of diamond generating methods are a method of generating diamonds under high temperature and high pressure through black lead, iron, Co, Ni, etc., a static synthesis method in which black lead or fran resin carbon reacts under high temperature and high pressure, a dynamic synthesis method, vapor phase synthesis method, etc. The diamonds that are employed in the present invention may be generated by any synthesis method.

Note that considering the effects of durability and a S/N ratio, a small quantity of diamonds alone are preferable. However, considering costs and other reasons, other abrasives, such as alumina, etc., may be used with diamonds. In this case, it is preferable that other abrasives be 500 wt % or less of diamonds. Even in the case where other abrasives are contained, diamond particles with particle sizes in a predetermined range are contained in an amount within a predetermined range, and therefore, the quantity of abrasive can be considerably reduced, compared with the quantity of an abrasive such as alumina used alone required for durability. The long-term stability of the quality of signals recorded on the magnetic recording medium can be achieved by preventing flaws from occurring in the master carrier surface during magnetic transfer. At the same time, durability can be assured, and a reduction in noise can be realized.

Examples of other abrasives other than diamonds, in addition to the above-described alumina abrasive (e.g., α-alumina of α-ratio 90% or greater, β-alumina, etc.), are silicon carbide, chromiumoxide, α-ironoxide, corundum, silicon nitride, silicon carbide, titanium carbide, titanium oxide, silicon dioxide, boron nitride, etc. These known abrasives with a Moh's hardness of 6 or greater can be employed singly or in combination. A complex of these abrasives (in which one abrasive is surface-treated with another abrasive) may also be used. In the case where these abrasive contain a compound or an element other than their main component, they can be employed without lessening their effect, if their main component is 90% or greater.

These abrasives other than diamonds may be added to the magnetic layer. They can also be added to the non-magnetic layer as necessary. If an abrasive is added to the non-magnetic layer, the surface shape can be controlled, or the state of protrusion of the abrasive can be controlled. The particle size and quantity of an abrasive that is added to the magnetic layer and non-magnetic layer should be set to optimum values, respectively.

The particle sizes of other abrasives other than diamonds are preferably in a range of 0.01 to 2 µm. Particularly, to enhance the electromagnetic transfer characteristic, narrower particle size distribution is preferable. To enhance durability, abrasives different in size may be combined together as necessary, or a particle size distribution for a single abrasive can be made wider. Even in this case, the same effect can be obtained. Preferably, the tap density is 0.3 to 2 g/cc, the percentage of water content 0.1 to 5 wt %, the pH 2 to 11, and the specific surface area 1 to 30 $m^2/g$. An abrasive that is employed in the present invention may be in the form of a needle, a sphere, or a cube. However, an abrasive with an edge in a portion of its form is preferred because the abrasive property is high.

Typical examples are AKP-12, AKP-15, AKP-20, AKP-30, AKP-50, HIT-20, HIT-30, HIT-55, HIT-60, HIT-70, HIT-80, HIT-100 (Sumitomo Kagaku); ERC-DBM, HP-DBM, HPS-DBM (Reynolds); WA10000 (Fujimi Kenmazai); UB-20 (Kamimura); G-5, CHROMEX U2, CHROMEX U1 (Nippon Kagaku); TF-100, TF-140 (Toda); Beta random ultrafine (Ibiden); and B-3 (Showa Kogyo).

The magnetic recording medium of the present invention is basically the same in construction as known magnetic recording media, except that a predetermined quantity of diamond particles described above are added as an abrasive. Among known magnetic recording media, a magnetic recording medium can be suitably employed that has a practically non-magnetic layer (underlying layer), and a magnetic layer formed on the non-magnetic layer and having ferromagnetic powder or ferromagnetic hexagonal ferrite powder distributed in a binder. In this magnetic recording medium, the thickness of the magnetic layer can be made 0.5 µm or less. In addition, it has high mechanical strength and is excellent in surface smoothness. Therefore, if this magnetic recording medium is employed, a magnetic recording medium with a high recording density and high durability can be obtained.

A preferred example of this magnetic recording medium will hereinafter be described in detail.

[Magnetic Layer]

The coercive force Hc of the magnetic layer of the magnetic recording medium is 143 kA/m (1800 Oe) or greater, preferably 159 kA/m (2000 Oe) or greater, and further preferably 183 to 279 kA/m (2300 to 3500 Oe). If it is 143 kA/m or greater, a high recording density can be more favorably achieved.

(Ferromagnetic Powder)

A typical example of ferromagnetic powder that is used in the overlying magnetic layer is ferromagnetic metal powder or hexagonal ferrite powder. It is preferable that ferromagnetic metal powder have a major axis length of 150 nm or less. It is also preferable that hexagonal ferrite powder have a major axis length of 35 nm or less.

It is preferable that ferromagnetic metal powder be a ferromagnetic alloy powder having α-Fe as its main component. This ferromagnetic metal powder, in addition to predetermined atoms, may contain atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr, B, etc. Particularly, it is preferable to include at least any one of atoms Al, Si, Ca, Y, Ba, La, Nd, Sm, Co, Ni, and B in addition to α-Fe. It is preferable that the Co content of the ferromagnetic metal powder be 40 atomic % or less of Fe and further preferable that it be 15 to 35 atomic %. Furthermore, it is preferable that the Co content be in a range of 20 to 35 atomic %. It is preferable that the Y content of the ferromagnetic metal powder be 1.5 to 12 atomic % of Fe and further preferable that it be 3 to 10 atomic %. Furthermore, it is preferable that the Y content be in a range of 4 to 9 atomic %. It is preferable that the Al content of the ferromagnetic metal powder be 1.5 to 30 atomic % of Fe and further preferable that it be 5 to 20 atomic %. Furthermore, it is preferable that the Al content be in a range of 8 to 15 atomic %. These ferromagnetic powders may be pretreated before dispersion by a dispersant, a lubricant, a surface active agent, an antistatic agent, etc.

Ferromagnetic hexagonal ferrite includes barium ferrite, strontium ferrite, lead ferrite, calcium ferrite, various substitution products of these, Co substitution products, etc. Typical examples are barium ferrite and strontium ferrite of a magneto plum-bite type, a magneto plum-bite type ferrite having particle surfaces coated with spinel, barium ferrite and strontium ferrite of a composite magneto plum-bite type partially containing a spinel phase, etc. The ferromagnetic hexagonal ferrite, in addition to predetermined atoms, may contain atoms such as Al, Si, S, Nb, Ti, V, Cr, Cu, Y, Mo, Rh, Pd, Ag, Sn, Sb, Te, W, Re, Au, Bi, La, Ce, Pr, Nd, P, Co, Mn, Zn, Ni, B, Ge, etc. Generally, the ferromagnetic hexagonal ferrite may contain elements such as Co—Zn, Co—Ti, Co—Ti—Zr, Co—Ti—Zn, Ni—Ti—Zn, Nb—Zn—Co, Sn—Zn—Co, Sn—Co—Ti, Nb—Zn, etc. Ferromagnetic hexagonal ferrite contains specific impurities depending on materials and generation methods. The powder size is a hexagonal plate size, and preferably, the average plate size is 10 to 30 nm.

The specific surface area of the ferromagnetic powder in the magnetic layer represented by a BET method is normally 45 to 80 m2/g. The crystal lattice size of the ferromagnetic metal powder is normally in a range of 8 to 18 nm, preferably in a range of 10 to 18 nm, and further preferably in a range of 11 to 17.5 nm. It is preferable that the average major axis length of the ferromagnetic metal powder be in a range of 30 to 150 nm and further preferable that it be in a range of 30 to 100 nm. It is preferable that the needle ratio of the ferromagnetic metal powder be in a range of 3 to 15 and further preferable that it be in a range of 5 to 12. The saturation magnetization σs of the ferromagnetic powder is normally in a range of 100 to 200 A·m$^2$/kg (100 to 200 emu/g) and preferably in a range of 120 to 180 A·m$^2$/kg (120 to 180 emu/g). The plate ratio of the hexagonal ferrite is normally in a range of 2 to 20 and preferably in a range of 2 to 5. The saturation magnetization σs is normally in a range of 30 to 70 A·m$^2$/kg (30 to 70 emu/g) and preferably in a range of 40 to 60 A·m$^2$/kg (40 to 60 emu/g). The ferromagnetic powder may be surface-treated with Al, Si, P, or an oxide of these as necessary.

The SFD of the ferromagnetic powder itself is preferably small and 0.8 or less. That is, it is preferable that a distribution of Hc for the ferromagnetic powder be made smaller. Particularly, if the SFD is 0.8 or less, then the electromagnetic transfer characteristic is good and the output is high. In addition, the magnetization reversal is sharp, the peak shift is reduced, and it is suitable for high-density digital magnetic recording. In ferromagnetic metal powder, the Hc distribution can be made smaller, for example, by a method of preventing sintering, which makes a distribution of goethite particles better.

(Carbon Black in the Magnetic Layer)

The magnetic layer, in addition to the above-described abrasive, may contain carbon black. Preferred examples are rubber furnace, rubber thermal, color black, acetylene black, etc. Preferably, the specific surface area is 5 to 500 m$^2$/g, DBP oil absorption 10 to 400 ml/100 g, the average particle size 5 to 300 nm, the pH 2 to 10, the percentage of water content 0.1 to 10 wt %, and the tap density 0.1 to 1 g/ml. When using carbon black, it is preferable to employ it in a range of 0.1 to 30 wt % of the ferromagnetic substance content. Carbon black can make a contribution to the static charge prevention, reduction in the friction coefficient, light interception, and enhancement in the film strength of the magnetic layer. These depend on the carbon black used.

[Non-Magnetic Layer (Underlying Layer)]

The underlying layer in the magnetic recording medium is not to be limited in its construction if it is practically non-magnetic. However, it is normally constructed of at least resin. Preferably, powder, for example, inorganic powder or organic powder is dispersed into resin. Inorganic powder is preferably non-magnetic powder. However, magnetic powder can also be used within the range that maintains the practically non-magnetic nature of the underlying layer. The expression "underlying layer is practically non-magnetic" is intended to mean that the underlying layer is allowed to have magnetism to the extent that the electromagnetic transfer characteristic of the overlying layer is not practically reduced.

(Non-Magnetic Powder)

The inorganic powder can be selected suitably from among inorganic compounds such as a metallic oxide, a metallic carbonate, a metallic sulfate, a metallic nitride, a metallic carbide, a metallic sulfide, etc. Among them, titanium dioxide, zinc oxide, iron oxide, and barium sulfate are preferred, because they have narrow particle distribution and many functional application means. Titanium dioxide and α-ironoxide are further preferable. The average particle size of these non-magnetic powders is preferably in a range of 0.005 to 2 μm. However, if non-magnetic powders different in particle size are combined as necessary, or particle distribution is widened within a single non-magnetic powder, the same effects can be obtained.

(Carbon Black, etc. in the Underlying Layer)

If the underlying layer contains carbon black, the surface electric resistance Rs can be lowered, the light transmission factor can be made smaller, and a desired micro-Vickers hardness can be obtained. In addition, if the underlying layer contains carbon black, it can have the effect of storing a lubricant. Rubber furnace, rubber thermal, color black, acetylene black, etc., can be employed.

[Binders]

The kind and quantity of a binder that is employed in the magnetic layer and underlying layer of the magnetic recording medium can utilize conventional techniques. For example, conventional thermoplastic resin, thermosetting resin, reaction type resin, and a mixture of these can be used.

Thermoplastic resin to be employed has a glass transition temperature of −100 to 150° C., a number average molecular weight of 1000 to 200000, preferably 10000 to 100000, and a polymerization degree of about 50 to 1000. Examples are polyurethane resin, various rubber resins, and a polymer or copolymer which contains a constituent unit derived from a monomer such as vinyl chloride, vinyl acetate, vinyl alcohol, maleic acid, acrylic acid, acrylic ester, vinylidene chloride, acrylonitrile, methacrylic acid, ester methacrylate, ethylene, styrene, butadiene, vinylbutyral, vinyl acetal, and vinyl ester.

Examples of thermosetting resin and reaction type resin are phenol resin, epoxy resin, polyurethane setting resin, urea resin, melamine resin, alkyd resin, acrylic reaction resin, formaldehyde resin, silicon resin, epoxy-polyamide resin, a mixture of polyester resin and isocyanate prepolymer, a mixture of polyester polyol and polyisocyanate, a mixture of polyurethane and polyisocyanate, etc.

The above-described resins can be used singly or in combination. Preferred examples are a combination of at least one selected from the group consisting of vinyl chloride resin, vinyl chloride-vinyl acetate copolymer, vinyl chloride-vinyl acetate-vinyl alcohol copolymer, and vinyl chloride-vinyl acetate-maleic anhydride copolymer, and polyurethane resin, and a combination of these and polyisocyanate. To obtain excellent dispersibility and durability in these binders, it is preferable to introduce at least one polar group, selected from the group consisting of —COOM, —$SO_3M$, —$OSO_3M$, —P=$O(OM)_2$, —O—P=$O(OM)_2$, —OH, —$NR_2$, —N+$R_3$, epoxy group, —SH, —CN (where M represents a hydrogen atom or alkali metal base, and R represents a carbon hydrogen group), into these binders as necessary. The quantity of such a specific group is preferably in a range of $10^{-1}$ to $10^{-8}$ mole/g and further preferably in a range of $10^{-2}$ to $10^{-6}$ mole/g.

A binder that is employed in the underlying layer of the magnetic recording medium is in a range of 5 to 50 wt % of non-magnetic powder and preferably in a range of 10 to 30 wt %. A binder that is employed in the magnetic layer of the magnetic recording medium is in a range of 5 to 50 wt % of ferromagnetic metal powder and preferably in a range of 10 to 30 wt %.

The magnetic recording medium is constructed basically of the above-described magnetic layer and underlying layer. At least one of the underlying layer or magnetic layer may be formed as multiple layers. Therefore, it is possible to change the quantity of the binder, the quantity of the vinyl chloride resin, polyurethane resin, polyisocyanate, or other resins in a binder, the molecular weight of each resin forming the magnetic layer, the quantity of the polar group, and the previously described physical properties as necessary. Optimization should be performed on each layer, and known techniques relating to multilayer construction can be utilized. When changing the quantity of the binder at each layer, for instance, it is necessary to increase the quantity of the binder of the magnetic layer to reduce flaws in the magnetic layer surface, or it is necessary to increase the quantity of the binder of the underlying layer to give flexibility so that a good head touch is obtained. When a change is made, it is preferable to perform optimization to the extent that the advantages of the present invention are exhibited.

It is preferable to add polyisocyanate to at least either the underlying layer or magnetic layer and harden each layer, because durability is enhanced. More specifically, isocyanates such as tolylenediisocyanate; 4,4'-diphenylmethanediisocyanate; hexamethylenediisocyanate, xylilenediisocyanate; naphthylene-1; 5-diisocyanate; o-toluidinediisocyanate; isophoronediisocyanate; triphenylmethanetridiisocyanate; etc., a product of these isocyanates and polyalcohol, a polyisocyanate generated by condensation of polyisocyanates, etc., can be used. These can be employed in each layer singly, or in combination by utilizing differences in hardening reactions thereof.

[Additives]

The magnetic layer and underlying layer of the magnetic recording medium may contain a wide variety of additives having a lubrication effect, an static charge prevention effect, a dispersion effect, a plastic effect, etc. Examples are silicon oil; silicon oil with a polar group; fatty acid modified silicon; fluorine-contained silicon; fluorine-contained alcohol; fluorine-contained ester; polyolefin; polyglycol; alkylphosphate and an alkali metal salt thereof; alkylsalfate and an alkali metal salt thereof; polyphenylether; phenylphosphonic acid; α-naphthyphosphoric acid; phenylphosphoric acid; diphenylphosphoric acid; p-ethylbenzenphosphonic acid; phenylhosphinic acid; aminoquinones; various silane coupling agents; titan coupling agents; fluorine-contained alkylsalfate and an alkali metal salt thereof; monobasic fatty acids of carbon numbers 10 to 24 (which may contain an unsaturated bond or may branch) and alkali metal salts of these (Li, Na, K, Cu, etc.); monohydric, dihydric, trihydric, tetrahydric, pentahydric, hexahydric alcohols of carbon numbers 12 to 22 (which may contain an unsaturated bond or may branch); alkoxyl alcohols of carbon numbers 12 to 22; monofatty acid ester or difatty acid ester or trifatty acid ester which comprises any one of monobasic fatty acids of carbon numbers 10 to 24 (which may contain an unsaturated bond or may branch) and monohydric, dihydric, trihydric, tetrahydric, pentahydric, hexahydric alcohols of carbon numbers 12 to 22 (which may contain an unsaturated bond or may branch); fatty acid ester of monoalkylether of an alkylene oxide polymer; fatty acid amides of carbon numbers 8 to 22; and fatty acid amines of carbon numbers 8 to 22.

In addition, all or some of the above-described additives may be added in the step of generating magnetic and non-magnetic coatings. For example, there are a case where additives are mixed with a magnetic substance before a kneading step, a case where additives are added in a step of kneading a magnetic substance, a binder, and an organic solvent, a case where additives are added in a dispersion step, a case where additives are added after dispersion, and a case where additive are added immediately before coating. In addition, after formation of the magnetic layer, all or some of additives may be used at the same time or in sequence, depending on the objects. After calendering (a pressurizing and heating process performed by a calendar roller) or after slit completion, a lubricant can be coated on the magnetic layer surface depending on the objective.

[Layer Construction]

A description will be given of the layer construction of the magnetic recording medium. The thickness of the substrate of the magnetic recording medium is preferably in a range of 2 to 100 μm and further preferably in a range of 2 to 80

μm. An intervening layer may be provided between the substrate and the underlying layer to enhance the intimate contact therebetween. The thickness of the intervening layer is preferably in a range of 0.01 to 0.5 μm and further preferably in a range of 0.02 to 0.5 μm.

The magnetic recording medium may be a magnetic recording medium in which magnetic layers (an underlying layer and a magnetic layer) are formed on both sides of a substrate, or a magnetic recording medium in which a magnetic layer is formed on only one side of a substrate. In the latter, a back coating may be provided on the side opposite to the underlying layer and magnetic layer to obtain a static charge prevention effect and a curl-correction effect. This thickness is preferably in a range of 0.1 to 4 μm and further preferably in a range of 0.3 to 2 μm. The above-described intervening layer and back coating are well known in the prior art.

The thickness of the magnetic layer of the magnetic recording medium is optimized in consideration of the saturated magnetization quantity and head gap length of a magnetic head to be employed and the band of signal to be recorded. The thickness of the magnetic layer is preferably in a range of 0.01 to 0.5 μm and further preferably in a range of 0.03 to 0.3 μm. Moreover, it is preferable that it be in a range of 0.03 to 0.10 μm. The magnetic layer may be separated into two or more layers having different magnetic characteristics, and a construction related to a known magnetic multilayer can be utilized.

The thickness of the underlying layer is normally in a range of 0.2 to 5 μm, preferably in a range of 0.3 to 3 μm, and further preferably in a range of 1 to 2.5 μm. As previously described, the underlying layer exhibits its effect if it is practically non-magnetic. For instance, even if the underlying layer contains impurities or purposely contains a small quantity of magnetic substances, it can be considered to be practically the same as the present invention. Such an example is a case where the residual magnetic flux density of the underlying layer is 0.01 tesla (100 gauss) or less and the coercive force is 7.96 kA/m (100 Oe) or less. Preferably, the underlying layer has no residual magnetic flux density and no coercive force.

[Substrate]

The non-magnetic substrate that is employed in the magnetic recording medium of the present invention is constructed of known film such as polyethyleneterephthalate, polyethylenenaphthalate, polyimide, polyamide, polysulphon, polybenzooxazole, etc. These support bodies may undergo a corona discharge treatment, a plasma treatment, an easy adhesion treatment, a heat treatment, a dust removing treatment, etc.

[Method of Fabricating the Magnetic Recording Medium]

The method of fabricating the magnetic recording medium of the present invention includes the preparation of a coating solution for forming each layer, application of the coating solution to the substrate, orientation treatment, drying, cooling, calendering, stamping, post-hardening, polishing, assembly, etc.

The step of generating the magnetic coating and non-magnetic coating of the magnetic recording medium includes at least a kneading step, a dispersion step, and mixing steps provided before and after these steps as necessary. Each step may be performed in two or more stages. The above-described ferromagnetic powder, non-magnetic powder, binder, carbon black, abrasive, antistatic agent, lubricant, and solvent may be added at the beginning or in the middle of any step. In addition, each material may be divided and added in two or more steps. For example, polyurethane may be divided and added in the kneading step, the dispersion step, and the mixing step for adjusting viscosity after dispersion.

The magnetic coating and non-magnetic coating are kneaded and dispersed by various kneaders. Examples of kneaders are a two-roll mill, a three-roll mill, a ball mill, a pebble mill, a revolving mill, a sand grinder, a szegvari, a high-speed impeller disperser, a high-speed stone mill, a high-speed impact mill, a disperser, a kneader, a high-speed mixer, a homogenizer, an ultrasonic disperser, etc.

A method for applying a coating solution is not particularly limited. In a preferred method, when the non-magnetic layer formed on the substrate by applying a first coating solution for the non-magnetic layer is in a wet state, a second coating solution for the magnetic layer is applied on the non-magnetic layer (i.e., wet-on-wet application). Then, drying is performed and a surface formation treatment is performed. In the wet-on-wet application method, the magnetic layer is uniform in thickness, defects such as pinholes are prevented, and yield rate is high. In addition, the intimate contact between the non-magnetic layer and the magnetic layer is enhanced and the separation of the magnetic layer from the non-magnetic layer is prevented. In the wet-on-wet application method, if the layer coated with the first coating solution for the non-magnetic layer is in a wet state, the second coating solution for the magnetic layer may be applied at the same time as the first coating solution or after the first coating solution.

In the case where the non-magnetic layer and the magnetic layer are generated by the wet-on-wet application method, it is preferable to apply the first and second coating solutions and then dry them slowly. Because a solvent in the magnetic layer evaporates slowly by slow drying, diamond particles are easily present on the magnetic layer surface. In the slow drying step, the coatings (non-magnetic and magnetic layers) are exposed continuously or intermittently for a predetermined time to a predetermined temperature. More specifically, they are passed through for 3 to 120 sec at a conveying speed of 50 to 800 m/min under a temperature of 20 to 120° C.

The surface formation treatment can be performed by a calender. The calender rolls are formed from a plastic material, which has a heat resisting property, such as epoxy, polyimide, polyamide, polyimideamide, etc. The line pressure is in a range of 50 to 500 kg/cm, preferably 100 to 400 kg/cm. The temperature is in a range of 20 to 130° C., preferably 40 to 120° C.

A master carrier for magnetic transfer that is employed in the present invention can employ a conventional one if the surface has a Moh's hardness of 6 to 10. The construction and material of the master carrier, the generation method, etc., are not particularly limited.

[First Embodiment]

Now, a first embodiment of the present invention will be described in further detail. Note in the embodiment that the word "part" or "parts" represents "weight part" or "weight parts."

[Generation of Master Carriers]

(Sample A)

The substrate of a master carrier employed a Ni substrate, which was generated by a stamper generation method. More specifically, the disk-shaped Ni substrate has a land/groove pattern, in which radial lines with a width of 0.5 μm are arranged between the disk center and a radial position of 20 to 40 mm, and the line pitch is 0.3 μm at the radially innermost position 20 mm away from the disk center.

The Ni substrate has a FeCo30at % layer (soft magnetic layer), which was formed at 25° C. The layer thickness of the soft magnetic layer is 200 nm, the Ar sputtering pressure is $1.5 \times 10^{-4}$ Pa (1.08 mTorr), and the applied voltage is 2.80 W/cm². The Moh's hardness of the surface of the master carrier obtained is 4.

(Sample B)

In the master carrier of the sample A, the surface was treated with an oxygen plasma to obtain a Moh's hardness of 6. The oxygen partial pressure is $7.5 \times 10^{-5}$ Pa (0.54 mTorr).

(Sample C)

In the master carrier of the sample A, the surface was provided with a diamond-like carbon (DLC) coating to obtain a Moh's hardness of 9.5.

[Generation of the Magnetic Recording Medium]

The materials of a coating (magnetic coating) for the magnetic layer and a coating (non-magnetic coating) for the non-magnetic underlying layer were prepared as listed below. The quantity of each ingredient is a quantity per 100 weight parts of ferromagnetic metal powder or non-magnetic powder.

| <Magnetic Coating A> | |
|---|---|
| Ferromagnetic metal powder | 100 parts |
| Composition: Fe 70%, Co 30% | |
| Hc: 2300 Oe | |
| Major axis length: 0.045 μm | |
| Crystal size: 120 Å | |
| σs: 150 emu/g | |
| Sintering preventives: | |
| Al compound (Al/Fe: atomic ratio 14%), | |
| Y compound (Y/Fe: atomic ratio 7%) | |
| Vinyl chloride copolymer (MR110: Nippon Zeon) | 10 parts |
| Polyurethane resin (UR8200: Toyobo) | 4 parts |
| α-alumina (HIT60: Sumitomo Chemical) | 5 parts |
| Diamond (average particle size 0.15 μm) | 1 part |
| Carbon black (#50: Asahi Carbon) | 1 part |
| Phenylphosphonic acid | 3 parts |
| Isocetyl stearate | 5 parts |
| Stearic acid | 1 part |
| Oleic acid | 1 part |
| Methyl ethyl ketone | 140 parts |
| Cyclohexane | 200 parts |
| <Magnetic Coating B> | |
| Hexagonal barium ferrite | 100 parts |
| Surface treatment: Al₂O₃ 5 wt %, | |
| SiO₂ 2 wt % | |
| Hc: 3000 Oe | |
| Plate size: 25 nm | |
| Plate ratio: 3 | |
| σs: 56 emu/g | |
| Vinyl chloride copolymer (MR110: Nippon Zeon) | 6 parts |
| Polyurethane resin (UR8200: Toyobo) | 3 parts |
| α-alumina (HIT60: Sumitomo Chemical) | 5 parts |
| Diamond (average particle size 0.15 μm) | 1 part |
| Carbon black (#50: Asahi Carbon) | 1 part |
| Isocetyl stearate | 5 parts |
| Stearic acid | 1 part |
| Oleic acid | 1 part |
| Methyl ethyl ketone | 80 parts |
| Cyclohexane | 120 parts |

-continued

| <Non-magnetic Coating> | |
|---|---|
| Non-magnetic powder TiO₂ crystal rutile | 100 parts |
| Average primary particle size: 0.035 μm | |
| Specific surface area by BET: 40 m²/g | |
| pH: 7; TiO₂ content: 90% or greater | |
| DBP oil absorption 27 to 38 ml/100 g | |
| Surface treatment agent: Al₂O₃, SiO₂ | |
| Carbon black (EC) | 13 parts |
| Vinyl chloride copolymer (MR110: Nippon Zeon) | 17 parts |
| Polyurethane resin (UR8200: Toyobo) | 6 parts |
| Phenylphosphonic acid | 3 parts |
| Isocetyl stearate | 6 parts |
| Oleic acid | 1 part |
| Stearic acid | 1 part |
| Methyl ethyl ketone | 120 parts |
| Cyclohexane | 180 parts |

(Sample 1)

In the above-described magnetic coating A, magnetic coating B, and non-magnetic coating, the ingredients were kneaded with a kneader and dispersed with a sand mill. In the dispersed solutions of the magnetic coating A, magnetic coating B, and non-magnetic coating, 13 parts of polyisocyanate were added to the coating solution of the non-magnetic layer, 4 parts of polyisocyanate were added to the coating solution of the magnetic layer A, and 5 parts of polyisocyanate were added to the coating solution of the magnetic layer B. Furthermore, 30 parts of cyclohexane were added to each of the three coating solutions. Next, they were passed through a filter with an average bore diameter of 1 μm. In this way, the coating solution for the non-magnetic layer and the coating solutions for the magnetic layers A and B were prepared.

The non-magnetic layer coating solution, obtained on the polyethylene terephthalate substrate of 62 μm in thickness and 3 nm in center line average height, was applied to have a thickness of 1.5 μm after drying. After drying, the obtained magnetic layer coating solution was applied on the non-magnetic layer coating solution to obtain a thickness of 0.1 μm after drying. After drying, the magnetic medium was treated at a temperature of 90° C. and a line pressure of 300 kg/cm with a 7-roll calender. The magnetic medium was stamped out so as to have a diameter of 3.7 in, and the surface was polished.

Using the master carrier of sample C, a servo signal was transferred magnetically to the obtained magnetic medium. After magnetic transfer, the medium was inserted into a 3.7-in cartridge with a liner installed inside (Zip-disk cartridge produced by Iomega), and predetermined mechanical parts were operated. In this way, a 3.7-in magnetic recording medium (disk) was obtained.

(Samples 2 to 14)

Samples 2 to 14 are the same as sample 1 except the particle size and quantity of a diamond added to the magnetic coating A, as listed in Table 1.

(Sample 15)

Sample 15 is the same as sample 1 except that the master carrier is changed from that of sample C to that of sample A.

(Sample 16)

Sample 16 is the same as sample 1 except that the master carrier is changed from that of sample C to that of sample B.

(Sample 17)

Sample 17 is the same as sample 1 except that the magnetic coating A is changed to the magnetic coating B.

(Samples 18 to 30)

Samples 18 to 30 are the same as sample 1 except the particle size and quantity of a diamond added to the magnetic coating B, as listed in Table 1.

The particle size and quantity of diamond particles in each sample, Moh's hardness, quality evaluation by the number of signal-transferred sheets, and result of durability are listed in Table 1. The number of signal-transferred sheets and durability were evaluated by the following methods.

(Quality Evaluation by the Number of Signal Transferred Sheets)

For each of the magnetic media of the obtained samples 1 to 30, a signal with a bit length of 0.3 µm was magnetically transferred by the master carriers of the samples A to C. The magnetic transfer to the magnetic medium was stopped when the level of the reproduced signal was 2 dB lower than that of the signal at the starting point. At this time, the number of signal-transferred media was calculated.

(Durability under Cyclic Environment)

A floppy disk drive (ZIP100 with a speed of 2968 rpm produced by Tomega) was employed. With the magnetic head fixed at the position of radius 38 mm, recording was performed at recording density 34 KFCI. Thereafter, the signal was reproduced and the output was considered as 100%. Each sample was rotated for 1500 hr under thermocyclic environment in which the thermocylce shown in FIG. 1 is set as one cycle. The output was monitored at intervals of 24 hours. When the output value was 70% or less of the initial value, the durability test was stopped.

According to Table 1, in the samples (1 to 4, 6, 7, 9, 10, 12, 13, 16 to 20, 22, 23, 25, 26, 28, and 29) in which the magnetic layer contains diamond particles of 0.03 to 0.5 µm and the diamond particle content is in a range of 0.1 to 5 wt % of the ferromagnetic powder contained in the magnetic layer, the master carrier surface is prevented from being flawed by the magnetic recording medium during magnetic transfer. In addition, the number of signal-transferred sheets exceeds 1000000 and therefore good quality and sufficient running durability are obtained. In sample 15, the size and quantity of diamond particles are in the above-described ranges, but the Moh's hardness of the master carrier surface is as low as 4. Because of this, the master carrier surface was flawed during magnetic transfer, and the number of signal-transferred sheets was reduced.

On the other hand, in the samples 5 and 21 in which the diamond particle size is less than 0.03 µm specified by the present invention, durability was insufficient. Conversely, in the samples 8 and 24 in which the diamond particle size is greater than 5 µm specified by the present invention, the number of signal-transferred sheets was reduced and durability was insufficient. In the samples 11 and 27 in which the quantity of diamond particles added is less than 0.1 wt % specified by the present invention, durability was insufficient. Conversely, in the samples 14 and 30 in which the quantity of diamond particles added is greater than 5 wt % specified by the present invention, the number of signal-transferred sheets was reduced and durability was insufficient.

As set forth above, in the first flexible magnetic recording medium, the magnetic layer contains an abrasive comprising diamond particles whose average particle size is 0.03 to 0.5

TABLE 1

| Magnetic recording medium sample | Magnetic coating kind | Diamond particle size (µm) | Diamond quantity (part or parts) | Master carrier sample | Master carrier surface Moh's hardness | Number of signal-transferred sheet (×10000) | Durability (hr) |
|---|---|---|---|---|---|---|---|
| 1 | A | 0.15 | 1 | C | 9.5 | 100< | 1500< |
| 2 | A | 0.1 | 1 | C | 9.5 | 100< | 1500< |
| 3 | A | 0.05 | 1 | C | 9.5 | 100< | 1500< |
| 4 | A | 0.03 | 1 | C | 9.5 | 100< | 1500 |
| 5 | A | 0.01 | 1 | C | 9.5 | 100< | 500 |
| 6 | A | 0.3 | 1 | C | 9.5 | 100< | 1500< |
| 7 | A | 0.5 | 1 | C | 9.5 | 100< | 1500 |
| 8 | A | 0.6 | 1 | C | 9.5 | 20 | 500 |
| 9 | A | 0.15 | 0.5 | C | 9.5 | 100< | 1500< |
| 10 | A | 0.15 | 0.1 | C | 9.5 | 100< | 1200 |
| 11 | A | 0.15 | 90.05 | C | 9.5 | 100< | 500 |
| 12 | A | 0.15 | 3 | C | 9.5 | 100< | 1500< |
| 13 | A | 0.15 | 5 | C | 9.5 | 100< | 1200 |
| 14 | A | 0.15 | 7 | C | 9.5 | 20 | 500 |
| 15 | A | 0.15 | 1 | A | 4 | 10 | 1500< |
| 16 | A | 0.15 | 1 | B | 6 | 100 | 1500< |
| 17 | B | 0.15 | 1 | C | 9.5 | 100< | 1500< |
| 18 | B | 0.1 | 1 | C | 9.5 | 100< | 1500< |
| 19 | B | 0.05 | 1 | C | 9.5 | 100< | 1500< |
| 20 | B | 0.03 | 1 | C | 9.5 | 100< | 1500 |
| 21 | B | 0.01 | 1 | C | 9.5 | 100< | 500 |
| 22 | B | 0.3 | 1 | C | 9.5 | 100< | 1500< |
| 23 | B | 0.5 | 1 | C | 9.5 | 100< | 1500 |
| 24 | B | 0.6 | 1 | C | 9.5 | 20 | 500 |
| 25 | B | 0.15 | 0.5 | C | 9.5 | 100< | 1500< |
| 26 | B | 0.15 | 0.1 | C | 9.5 | 100< | 1200 |
| 27 | B | 0.15 | 0.05 | C | 9.5 | 100< | 500 |
| 28 | B | 0.15 | 3 | C | 9.5 | 100< | 1500< |
| 29 | B | 0.15 | 5 | C | 9.5 | 100< | 1200 |
| 30 | B | 0.15 | 7 | C | 9.5 | 20 | 500 |

μm. In addition, the diamond particle content is in a range of 0.1 to 5 wt % of the ferromagnetic powder contained in the magnetic layer. Therefore, the first flexible magnetic recording medium is capable of maintaining its running durability, while preventing the master carrier from being flawed during magnetic transfer.

Now, a description will be given of a second flexible magnetic recording medium. In the second flexible magnetic recording medium, the magnetic layer includes polyurethane resin which contains in a range of 0.05 to 0.7 meq/g at least one kind of polar group (hereinafter referred to as a specific polar group) selected from the group consisting of —$SO_3M$, —$OSO_3M$, —$P=O(OM)_2$, —$O—P=O(OM)_2$, and —COOH (where M represents a hydrogen atom, alkali metals, or an ammonium salt). The polyurethane resin content is 60 wt % or greater of the quantity of all resins in the magnetic layer.

In the second flexible magnetic recording medium, the magnetic layer includes polyurethane resin that contains the above-described specific polar group in a predetermined range as a binder. The polyurethane resin content is 60 wt % or greater of the quantity of all resins. Therefore, a binder for the non-magnetic layer can use known binders to be described later, but it may employ the above-described polyurethane resin contained in the magnetic layer. If the above-described polyurethane resin is employed as a binder that is employed in the flexible magnetic recording medium, then the long-term stability of the quality of signals recorded on the magnetic recording medium can be achieved.

The above-described specific polar group is contained in a range of 0.05 to 0.7 meq/g. If the specific polar group is outside this range, it will become difficult to disperse magnetic powder. The alkyl group of polyurethane resin preferably has carbon numbers 1 to 18. It maybe a straight chain structure or a branch structure.

Preferred examples of polyurethane resin are:
(1) Polyurethane resin (A) containing the above-described polar group in the above-described range, obtained by causing a reaction between polyol of molecular weight 500 to 5000 having a ring structure and an alkylene oxide chain, polyol of molecular weight 200 to 500 having a ring structure and serving as a chain extender, and organic diisocyanate,
(2) Polyurethane resin (B) containing the above-described polar group in the above-described range, obtained by causing a reaction between polyesterpolyol consisting of aliphatic diol having no ring structure which has aliphatic dibasic acid and an alkyl branch side chain, aliphatic diol having a branch alkyl side chain whose carbon number is 3 or greater and serving as a chain extender, and an organic diisocyanate compound, and
(3) Polyurethane resin (C) containing the above-described polar group in the above-described range, obtained by causing a reaction between a polyol compound having a ring structure and an alkyl chain whose carbon number is 2 or greater, and organic diisocyanate.

Polyurethane Resin (A)

The polyol with a ring structure and an alkylene oxide chain, which is the material of the polyurethane resin (A), can employ an alkylene oxide, such as an ethylene oxide, a propylene oxide, etc., added to diol having a ring structure. Examples of diol are bisphenol A; bisphenol hydride A; bisphenol S; bisphenol hydride S; bisphenol P; bisphenol hydride P; tricyclodecanedimethanol; cyclohexanedimethanol; cyclohexanediol; 5,5'-(1-methyleethylidene)bis-(1,1'-bicyclohexyl)2-ol; 4,4'-(1-methyleethylidene)bis-2-methylcyclohexanol; 5,5'-(1,1'-cyclohexylidene)bis-(1,1'-bicyclohexyl)2-ol; 5,5'-(1,1' cyclohexylmethylene)bis-(1,1'-bicyclohexyl)2-ol; hydroterpenediphenol; diphenolbisphenol A; diphenolbisphenol S; diphenolbisphenol P; 9,9'-bis-(4-hydroxyphenyl)fluorene; 4,4'-(3-methylethylidene)bis(2-cyclohexyl-5-methylphenol); 4,4'-(3-methylethylidene)bis(2-phenyl-5-methylcyclohexanol); 4,4'-(1-phenylethylidene)bis(2-phenol); 4,4'-(cyclohexyliden)bis(2-methylphenol); terpenediphenol; etc. Among them, bisphenol hydride A, and a polypropylene oxide added to bisphenol hydride A, are preferred. It is preferable that the molecular weight of the above-describe polyol be 500 to 5000. If the molecular weight is 500 or greater, then the concentration of the urethane group is low and therefore solvent solubility is high. If it is 5000 or less, then coating strength is good and therefore durability can be made higher.

The polyol with a ring structure, which is employed as a chain extender, can employ an alkylene oxide, such as an ethylene oxide, a propylene oxide, etc., added in a range of molecular weight 200 to 500 to the above-described diol having a ring structure. Bisphenol hydride A, and a polypropylene oxide added to bisphenol hydride A, are preferable.

Polyurethane Resin (B)

The polyesterpolyol that is the material of the polyurethane resin (B) consists of aliphatic diol having no ring structure which has aliphatic dibasic acid and an alkyl branch side chain. The aliphatic dibasic acid can use succinic acid, adipic acid, azelaic acid, sebasic acid, malonic acid, glutaric acid, pimelic acid, suberic acid, etc. Among them, succinic acid, adipic acid, and sebasic acid are preferable. In all dibasic acid ingredients in polyesterpolyol, the aliphatic dibasic acid content is preferably 70 mol % or greater. If it is 70 mol % or greater, the concentration of dibasic acid having a ring structure is practically low and therefore solvent solubility is high. In addition, dispersibility can be enhanced.

The aliphatic polyol, which can be employed in polyesterpolyol, having no ring structure that has an alkyl branch side chain can use branch aliphatic diol such as 2,2-dimethyl-1,3-propanegiol; 3,3-dimethyl-1,5-pentanegiol; 2-methyl-2-ethyl-1,3-propanegiol; 3-methyl-3-ethyl-1,5-pentanegiol; 2-methyl-2-propyl-1,5-propanegiol; 3-methyl-3-propyl-1,5-pentanegiol; 2-methyl-2-butyl-1,3-propanegiol; 3-methyl-3-butyl-1,5-pentanegiol; 2,2-diethyl-1,3-propanegiol; 3,3-diethyl-1,5-pentanegiol; 2-ethyl-2-butyl-1,3-propanegiol; 3-ethyl-3-butyl-1,5-pentanegiol; 2-ethyl-2-propyl-1,3-propanegiol; 3-ethyl-3-propyl-1,5-pentanegiol; 2,2-dibutyl-1,3-propanegiol; 3,3-dibutyl-1,5-pentanegiol; 2,2-dipropyl-1,3-propanegiol; 3,3-dipropyl-1,3-pentanegiol; 2-butyl-2-propyl-1,3-propanegiol; 3-butyl-3-propyl-1,5-pentanegiol; 2-ethyl-1,3-propanegiol; 2-propyl-1,3-propanegiol; 2-butyl-1,3-propanegiol; 3-ethyl-1,5-pentanegiol; 3-propyl-1,5-pentanegiol; 3-butyl-1,5-pentanegiol; 3-octyl-1,5-pentanegiol; 3-myristil-1,5-pentanegiol; 3-stearyl-1,5-pentanegiol; 2-ethyl-1,6-hexanegiol; 2-propyl-1,6-hexanegiol; 2-butyl-1,6-hexanegiol; 5-ethyl-1,9-nonanegiol; 5-propyl-1,9-nonanegiol; 5-butyl-1,9-nonanegiol; etc. Among them, 2,2-dimethyl-1,3-propanegiol; 2-ethyl-2-butyl-1,3-propanegiol; and 2,2-diethyl-1,3-propanegiol are preferable. The polyol content having a branch side chain, which is employed in polyesterpolyol, is preferably in a range of 50 to 100 mol % and further preferably in a range of 70 to 100 mol %. In this range, solvent solubility is high and therefore good dispersibility can be obtained.

In the above-described polyurethane resin (B), aliphatic diol having a branch alkyl side chain whose carbon number is 3 or greater can be employed as a chain extender. If aliphatic diol has a branch alkyl side chain whose carbon number is 3 or greater, solvent solubility is enhanced and therefore good dispersibility can be obtained.

The aliphatic diol having a branch alkyl side chain whose carbon number is 3 or greater can use 2-methyl-2-ethyl-1,3-propanegiol; 3-methyl-3-ethyl-1,5-pentanegiol; 2-methyl-2-propyl-1,5-propanegiol; 3-methyl-3-propyl-1,5-pentanegiol; 2-methyl-2-butyl-1,3-propanegiol; 3-methyl-3-butyl-1,5-pentanegiol; 2,2-diethyl-1,3-propanegiol; 3,3-diethyl-1,5-pentanegiol; 2-ethyl-2-butyl-1,3-propanegiol; 3-ethyl-3-butyl-1,5-pentanegiol; 2-ethyl-2-propyl-1,3-propanegiol; 3-ethyl-3-propyl-1,5-pentanegiol; 2,2-dibutyl-1,3-propanegiol; 3,3-dibutyl-1,5-pentanegiol; 2,2-dipropyl-1,3-propanegiol; 3,3-dipropyl-1,3-pentanegiol; 2-butyl-2-propyl-1,3-propanegiol; 3-butyl-3-propyl-1,5-pentanegiol; 2-ethyl-1,3-propanegiol; 2-propyl-1,3-propanegiol; 2-butyl-1,3-propanegiol; 3-ethyl-1,5-pentanegiol; 3-propyl-1,5-pentanegiol; 3-butyl-1,5-pentanegiol; 3-octyl-1,5-pentanegiol; 3-myristil-1,5-pentanegiol; 3-stearyl-1,5-pentanegiol; 2-ethyl-1,6-hexanegiol; 2-propyl-1,6-hexanegiol; 2-butyl-1,6-hexanegiol; 5-ethyl-1,9-nonanegiol; 5-propyl-1,9-nonanegiol; 5-butyl-1,9-nonanegiol; etc. Among them, 2-ethyl-2-butyl-1,3-propanegiol and 2,2-diethyl-1,3-propanegiol are preferable. The aliphatic diol content of the polyurethane resin (B) is preferably in a range of 5 to 30 wt % and further preferably in a range of 10 to 20 wt %. In this range, solvent solubility is high and therefore good dispersibility can be obtained.

Polyurethane Resin (C)

The polyol compound, which is the material of the above-described polyurethane resin (C), having a ring structure and an alkyl chain whose carbon number is 2 or greater is preferably diol with a molecular weight of 500 to 1000. If it is diol, gelation due to bridge formation at the time of polyurethane polymerization will not occur. In addition, if the carbon number of the alkyl chain of the above-described diol is 2 or greater, solvent solubility is high and therefore dispersibility is good. If the molecular weight is 500 or greater, the concentration of the urethane group is low and therefore solubility is high. If it is 1000 or less, coating strength is good. The polyol, which has a ring structure and an alkyl chain whose carbon number 2 or greater, is obtained by hydrogenating and deoxidizing dimeric acid. For example, dimerdiol with the following structure is preferable.

Formula 1

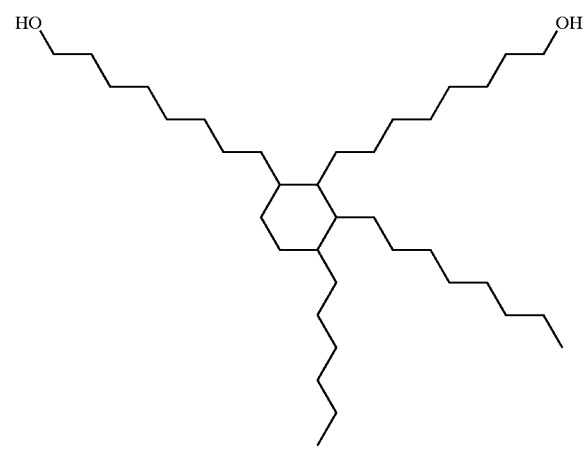

Diol, which has a ring structure and an alkyl chain whose carbon number is 2 or greater, is preferable in a range of 5 to 60 wt % in the polyurethane resin (C) and further preferably in a range of 10 to 40 wt %. If the diol content is in the above-described ranges, solvent solubility is high and therefore dispersibility is good. Furthermore, durability can be enhanced.

In the present invention, organic diisocyanate that is caused to react with the above-described polyol to generate polyurethane resin is not particularly limited. Ordinary organic diisocyanate can be employed. Examples are hexamethylenediisocyanate; tridinediisocyanate; isophoronediisocyanate; 1,3-xylilenediisocyanate; 1,4-xylilenediisocyanatecyclohexanediisocyanate; tolidinediisocyanate; 2,4-tolylenediisocyanate; 2,6-tolylenediisocyanate; 4,4'-diphenylmethanediisocyanate; p-phenylenediisocyanate; m-phenylenediisocyanate; 1,5-naphthalenediisocyanate; 3,3-dimethylphenylenediisocyanate; etc.

By generating polyurethane resin from a monomer which introduces a polar group, polyurethane resin with a polar group can be generated. For example, polyurethane resin with a polar group can be generated by a method of generating it from polar-group contained polyol (such as polyesterpolyol and polyetherpolyol having a polar group), polyole such as polyesterpolyol and polyetherpolyol having no polar group, and diisocyanate, or a method of generating it by changing a portion of a dihydric alcohol or dibasic acid to polar-group contained diol or polar-group contained dibasic acid. The above-described polar-group contained polyol or polar-group contained dibasic acid contains, in the main or side chain of the above-described polyol or dibasic acid, at least one kind of polar group selected from the group consisting of $—SO_3M$, $—OSO_3M$, $—P=O(OM)_2$, $—O—P=O(OM)_2$, and $—COOH$ (where M represents a hydrogen atom, alkali metals, or ammonium).

The average molecular weight of polar-group contained polyurethane resin that is employed in the present invention is preferably in a range of 5000 to 100000 and further preferably in a range of 10000 to 50000. If it is 5000 or greater, a magnetic coating is high in physical strength and therefore the durability of the magnetic recording medium can be enhanced. If it is 100000 or less, solubility to a solvent is high and therefore dispersibility can be enhanced. In addition, coating viscosity at a predetermined concentration is suitable and therefore workability is good and handling can be facilitated.

The polar-group contained polyurethane resin that is employed in the present invention preferably has OH-groups from the view point of hardening properties and durability. The number of OH-groups is preferably in a range of 2 to 40 per molecule and further preferable in a range of 3 to 20 per molecule.

In the present invention, polyurethane resin other than the above-described polyurethane resin can also be used together.

Preferably, polyurethane resin to be used together has the same polar group as the above-described polyurethane resin. The above-described chain extender uses polyhydric alcohol, aliphatic alcohol, alicyclic polyamine, aromatic polyamine, etc., which are well known in the prior art. Among them, polyhydric alcohol with a molecular weight of 50 to 500 is preferable. If it is 50 or greater, coating strength is high and therefore durability can be enhanced. If it is 500 or less, the glass transition temperature Tg of a coating is high and therefore the coating becomes hard and durability can be enhanced.

Polyhydric alcohol can employ a short chain diol such as bisphenol A, bisphenol hydride A, bisphenol S, bisphenol P, an ethylene oxide added to these, a propylene oxide added to these, cyclohexanedimethanol, cyclohexanediol, hydroquinone, bis(2-hydroxyethyl)tetrabromobisphenol A, bis(2-hydroxyethyl)tetrabromobisphenol S, bis(2-hydroxyethyl)tetramethylbisphenol S, bis(2-hydroxyethyl) diphenylbisphenol S, bis(2-hydroxyethyl) diphenylbisphenol, bis(2-hydroxyethyl)thiodiphenol, bis(2-hydroxyethyl)bisphenol F, biphenol, bisphenolfluorene, bisphenolfluorenedihydroxyethylether, etc. Among them, diol, which has aromatic and alicyclic structures, such as bisphenol, bisphenol hydride A, bisphenol S, bisphenol P, ethylene oxide and polypropylene oxide added to these, cyclohexanedimethanol, cyclohexanediol, etc., are preferred.

While the binder in the present invention employs the above-described polar-group contained polyurethane resin, other resins, such as vinyl chloride resin, acrylic resin, etc., may be used together. Preferably, these resins have at least one kind of polar group selected from the group consisting of $-SO_3M$, $-OSO_3M$, $-P=O(OM)_2$, $-O-P=O(OM)_2$, and $-COOH$ (where M represents a hydrogen atom, an alkali metal ion, or an ammonium ion).

The resins that can be used together are not particularly limited. Conventional thermoplastic resin, thermosetting resin, reaction type resin, and a mixture of these can be used. Thermoplastic resin that is employed has a glass transition temperature of $-100$ to $150°$ C. and a number average molecular weight of 1000 to 200000, preferably 10000 to 100000. Examples are various rubber resins, and a polymer and a copolymer which contain, as a constituent unit, vinylidene chloride, acrylonitrile, styrene, butadiene, ethylene, vinyl butyral, vinyl acetal, vinyl ester, etc. Examples of thermosetting resin and reaction type resin are phenol resin, phenoxy resin, epoxy resin, urea resin, melamine resin, alkyd resin, acrylic reaction resin, formaldehyde resin, silicon resin, epoxy-polyamide resin, a mixture of polyester resin and isocyanate prepolymer, etc. The above-described resins can be used singly or in combination.

In the present invention, a binder can be employed in a range of 5 to 50 weight parts with respect to 100 weight parts of ferromagnetic powder or non-magnetic powder. Particularly, if the binder content is in a range of 7 to 45 weight parts, the glossiness of the magnetic layer surface or non-magnetic layer surface becomes high and the dispersibility of ferromagnetic powder or nonmagnetic powder can be enhanced. Furthermore, if the binder content is in a range of 10 to 40 weight parts, the electromagnetic transfer characteristic is considerably improved. If the binder content is less than 5 weight parts, ferromagnetic powder or nonmagnetic powder is not bound. On the other hand, if it is greater than 50 weight parts, dispersibility of ferromagnetic powder or nonmagnetic powder cannot be further enhanced, and in the magnetic layer, a reduction in the fill amount of ferromagnetic powder and a reduction in the electromagnetic transfer characteristic often occur.

The second flexible magnetic recording medium of the present invention is constructed basically of a magnetic layer and an underlying layer (non-magnetic layer). At least either the underlying layer or magnetic layer may be formed into a multilayer. Therefore, it is possible to change the quantity of the binder, the quantity of polyurethane resin or other resins in the binder, the molecular weight of each resin forming the magnetic layer, and the quantity of the polar group within the scope of the present invention as necessary. Optimization should be performed on each layer, and known techniques relating to multilayer construction can be utilized. When changing the quantity of the binder at each layer, for instance, it is necessary to increase the quantity of the binder of the magnetic layer to reduce flaws in the magnetic layer surface, or it is necessary to increase the quantity of the binder of the underlying layer to give flexibility so that a good head touch is obtained. When a change is made, it is preferable to perform optimization to the extent that the advantages of the present invention are exhibited.

The second flexible magnetic recording medium of the present invention is basically the same in construction as known magnetic recording media except a predetermined binder employed in the magnetic layer. Among them, a magnetic recording medium can be suitably employed that has a practically non-magnetic layer (underlying layer), and a magnetic layer formed on the non-magnetic layer and having ferromagnetic powder or ferromagnetic hexagonal ferrite powder distributed in a binder. In this magnetic recording medium, the thickness of the magnetic layer can be made 0.5 $\mu$m or less. In addition, it has high mechanical strength and is excellent in surface smoothness. Therefore, if this magnetic recording medium is employed, a magnetic recording medium with a high recording density and high durability can be obtained.

A preferred example of this magnetic recording medium will hereinafter be described in detail.

[Magnetic Layer]

A description of the magnetic layer is omitted because it is the same as the contents described in the [Magnetic Layer] of the first flexible magnetic recording medium.

(Ferromagnetic Powder)

A description of the ferromagnetic powder is omitted because it is the same as the contents described in the (Ferromagnetic Powder) of the first flexible magnetic recording medium.

(Carbon Black in the Magnetic Layer)

A description of the carbon black in the magnetic layer is omitted because it is the same as the contents described in the (Carbon Black in the Magnetic Layer) of the first flexible magnetic recording medium.

[Non-Magnetic Layer (Underlying Layer)]

A description of the non-magnetic layer (underlying layer) is omitted because it is the same as the contents described in the [Non-Magnetic Layer (Underlying Layer)] of the first flexible magnetic recording medium.

(Non-Magnetic Powder)

A description of the non-magnetic powder is omitted because it is the same as the contents described in the (Non-Magnetic Powder) of the first flexible magnetic recording medium.

(Abrasive in the Underlying Layer)

The underlying layer may contain an abrasive. The abrasive, in addition to the above-described natural and artificial diamonds contained in the magnetic layer, can use molten alumina, silicon carbide, chromium oxide, serium oxide, $\alpha$-iron oxide, corundum, artificial corundum, silicon nitride, titanium carbide, titanium oxide, silicon dioxide, boron nitride, garnet, emery (main ingredients: corundum and magnetic iron ore), etc. If the underlying layer contains an abrasive, the surface shape and the state of protrusion of the abrasive can be controlled.

(Carbon Black, etc. in the Underlying Layer)

A description of the carbon black, etc. in the underlying layer is omitted because it is the same as the contents described in the (Carbon Black, etc. in the Underlying Layer) of the first flexible magnetic recording medium.

[Additives]

A description of the additives is omitted because it is the same as the contents described in the [Additives] of the first flexible magnetic recording medium.

[Layer Construction]

A description of the layer construction is omitted because it is the same as the contents described in the [Layer Construction] of the first flexible magnetic recording medium.

[Substrate]

A description of the substrate is omitted because it is the same as the contents described in the [Substrate] of the first flexible magnetic recording medium.

[Method of Fabricating the Magnetic Recording Medium]

The method of fabricating the second flexible magnetic recording medium of the present invention includes the preparation of a coating solution for forming each layer, application of the coating solution to the substrate, orientation treatment, drying, cooling, calendering, stamping, post-hardening, polishing, assembly, etc.

The step of generating the magnetic coating and non-magnetic coating of the magnetic recording medium includes at least a kneading step, a dispersion step, and mixing steps provided before and after these steps as necessary. Each step may be performed in two or more stages. Ferromagnetic powder, non-magnetic powder, a binder, carbon black, an abrasive, an antistatic agent, a lubricant, and a solvent may be added at the beginning or in the middle of any step. In addition, each material may be divided and added in two or more steps. For example, polyurethane may be divided and added in the kneading step, the dispersion step, and the mixing step for adjusting viscosity after dispersion.

The magnetic coating and non-magnetic coating are kneaded and dispersed by various kneaders. Examples of kneaders are a two-roll mill, a three-roll mill, a ball mill, a pebble mill, a revolving mill, a sand grinder, a szegvari, a high-speed impeller disperser, a high-speed stone mill, a high-speed impact mill, a disperser, a kneader, a high-speed mixer, a homogenizer, an ultrasonic disperser, etc.

A method for applying a coating solution is not particularly limited. When the non-magnetic layer formed on the substrate by applying a first coating solution for the non-magnetic layer is in a wet state, a second coating solution for the magnetic layer may be applied on the non-magnetic layer (wet-on-wet method). Alternatively, after the first coating solution is dried, the second coating solution may be applied on the non-magnetic layer (wet-on-dry method). In the wet-on-wet method, the magnetic layer is uniform in thickness, defects such as pinholes are prevented, and yield rate is high. In addition, the intimate contact between the non-magnetic layer and the magnetic layer is enhanced and the separation of the magnetic layer from the non-magnetic layer is prevented. In the wet-on-wet method, if the layer coated with the first coating solution for the non-magnetic layer is in a wet state, the second coating solution for the magnetic layer may be applied at the same time as the first coating solution or after the first coating solution. On the other hand, in the wet-on-dry method, a fluctuation in the interface between the magnetic layer and the non-magnetic layer is reduced, and consequently, noise can be prevented and a S/N ratio can be enhanced.

After drying, a surface smoothing process can be performed on the coating. The surface smoothing process can be performed by super calender rolls, etc. If the surface smoothing process is performed, bores produced by the removal of a solvent during drying are eliminated and the fill amount of the ferromagnetic powder in the magnetic layer is enhanced. As a result, a magnetic recording medium with a high electromagnetic transfer characteristic can be obtained. The calender rolls may be formed from a plastic material, which has a heat resisting property, such as epoxy, polyimide, polyamide, polyimideamide, etc. In the calendering process, the line pressure is in a range of 100 to 500 kg/cm, preferably 200 to 450 kg/cm, and the temperature is in a range of 60 to 130° C., preferably 80 to 100° C.

[Second Embodiment]

Now, a second embodiment of the present invention and comparative examples will be described in further detail. Note in the embodiment that the word "part" or "parts" represents "weight part" or "weight parts."

The materials of a binder, a coating (magnetic coating) for forming a magnetic layer and a coating (non-magnetic coating) for forming a non-magnetic underlying layer were prepared as listed below. The quantity of each ingredient is a quantity per 100 weight parts of ferromagnetic metal powder or non-magnetic powder.

<Compound of Polyurethane Resin PUA-1>

In a container equipped with a thermometer, a stirrer, and a reflux condenser, nitrogen replacement was performed in advance. In the container, polyetherpolyol of composition listed in Table 2 and short chain diol with a ring structure were dissolved into a cyclohexane-30% solution at 60° C. under the flow of nitrogen. Subsequently, 60 ppm of dibutyltinlaurate was added as a catalyst and dissolved for 15 min. Next, an organic diisocyanate compound listed in Table 2 was added and heated for 6 hr. In this way, polyurethane resin PUA-1 was obtained. The hydrophilic polar group content (—SO3Na) of the obtained polyurethane resin PUA-1 was 0.287 meq/g.

<Compounds of Polyurethane Resins PUA-2 to PUA-4 and PUC-1 to PUC-3>

In the same way as polyurethane resin PUA-1, polyurethane resins PUA-2, PUA-3, PUA-4, PUC-1, PUC-2, and PUC-3 were obtained by employing a chain extender and an organic diisocyanate compound listed in Table 2. The hydrophilic polar group of each polyurethane resin, the hydrophilic polar group content, etc., are listed in Table 2.

<Compound of Polyurethane Resin PUB-1>

365 parts of adipic acid, 260 parts of neopentylglycol, 2 wt % of zinc acetate, and 3 wt % of sodium acetate were put in a reaction container equipped with a thermometer, a stirrer, and a reflux condenser. Next, an ester exchange reaction was made for 3 hr at 180 to 220° C. Subsequently, a condensation polymerization reaction was made for 2 hr at 220 to 280° C. under a reduced pressure of 1 to 10 mmHg. In this manner, polyesterpolyol A was obtained.

Next, in the same manner as polyurethane resin PUA-1, polyurethane resin PUB-1 was obtained by employing the obtained polyesterpolyol A, a chain extender and an organic diisocyanate compound. The hydrophilic polar group content of the obtained polyurethane resin PUB-1 was 0.824 meq/g.

<Compounds of Polyurethane Resins PUB-2 to PUB-7>

In the same manner as polyurethane resin PUB-1, polyurethane resins PUB-2, PUB-3, PUB-4, PUB-5, PUB-6, and PUB-7 were obtained by employing polyesterpolyol, a chain extender and an organic diisocyanate compound listed in Table 2. The hydrophilic polar group of each polyurethane resin, the hydrophilic polar group content, etc., are listed in Table 2.

TABLE 2

|  |  | PUA-1 | PUA-2 | PUA-3 | PUA-4 | PUB-1 | PUB-2 | PUB-3 |
|---|---|---|---|---|---|---|---|---|
| Polyol | Polyester A | 40 |  | 40 | 40 |  |  |  |
|  | Polyester b, |  | 40 |  |  |  |  |  |
|  | Polyester A' |  |  |  |  | 45 | 45 |  |
|  | Dimerdiol |  |  |  |  |  |  | 45 |
| Chain extender | HBpA | 22 | 22 | 22 | 22 |  |  |  |
|  | 2-ethyl-2-butyl-1,3-propanediol |  |  |  |  | 10 | 10 | 10 |
|  | 1,6-hexanediol |  |  |  |  |  |  |  |
| Polar-group contained diol | A | 12 | 12 | 2 | 1 | 30 | 20 | 12 |
|  | B |  |  |  |  |  |  |  |
|  | C |  |  |  |  |  |  |  |
| Organic dissocyanate | MDI | 43.5 | 39.4 | 32.7 | 32.7 | 32.4 | 32.4 | 32.4 |
| Hydrophilic polar group | —SO$_3$Na content | 0.287 | 0.297 | 0.058 | 0.035 | 0.824 | 0.678 | 0.339 |
|  | —PO(OH)$_2$ content |  |  |  |  |  |  |  |
|  | —COOH content |  |  |  |  |  |  |  |
| Number average molecular weight |  | 42000 | 28000 | 42000 | 42000 | 42000 | 45000 | 40000 |

|  |  | PUB-4 | PUB-5 | PUB-6 | PUB-7 | PUC-1 | PUC-2 | PUC-3 |
|---|---|---|---|---|---|---|---|---|
| Polyol | Polyeter A |  |  |  |  |  |  |  |
|  | Polyeter b |  |  |  |  |  |  |  |
|  | Polyeter A' | 45 | 45 | 45 | 45 |  |  |  |
|  | Dimerdiol |  |  |  |  | 15 | 15 | 15 |
| Chain extender | HBpA |  |  |  |  | 35 | 35 | 35 |
|  | 2-ethyl-2-butyl-1,3-propanediol | 10 |  | 10 | 10 |  |  |  |
|  | 1,6-hexanediol |  | 6.8 |  |  |  |  |  |
| Polar-group contained diol | A | 4 | 12 |  |  | 12 | 2 | 1 |
|  | B |  |  | 12 |  |  |  |  |
|  | C |  |  |  | 12 |  |  |  |
| Organic diisocyanate | MDI | 32.4 | 32.4 | 32.4 | 32.4 | 54.1 | 46.7 | 46.7 |
| Hydrophilic polar group | —SO$_3$Na content | 0.115 | 0.35 |  |  | 0.29 | 0.057 | 0.035 |
|  | —PO(OH)$_2$ content |  |  | 0.345 |  |  |  |  |
|  | —COOH content |  |  |  | 0.325 |  |  |  |
| Number average molecular weight |  | 43000 | 38000 | 53000 | 50000 | 48000 | 32000 | 30000 |

HBpA: Bisphenol hydride A (molecular weight 240)
Polyeter A: Polypropylene oxide added to bisphenol hydride A (molecular weight 1000)
Polyeter b: Polypropylene oxide (molecular weight 1000)
Polyeter A': Adipic acid/neopentylglycol=73/52 (molecular weight 1000)
Polar-group contained diol A: ethylene oxide added to sulfoisophthalic acid
Polar-group contained diol B: replaced the SO$_3$Na group of polar-group contained diol with —PO(OH)$_2$
Polar-group contained diol C: replaced the SO$_3$Na group of polar-group contained diol with —COOH
MDl: 4,4'-diphenylmethanediisocyanate <Magnetic Coating A>

| Hexagonal barium ferrite | 100 parts |
|---|---|
| Surface treatment: Al$_2$O$_3$ 5 wt %, SiO$_2$ 2 wt % |  |
| Hc: 2500 Oe |  |
| Plate size: 25 nm |  |
| Plate ratio: 3 |  |
| σs: 56 emu/g |  |
| Vinyl chloride copolymer (MR110: Nippon Zeon) | 7 parts |
| Polyurethane resin (UR8200: Toyobo) | 3 parts |
| α-alumina (HIT60: Sumitomo Chemical) | 4 parts |
| Diamond (average particle size 100 μm) | 2 parts |
| Carbon black (#50: Asahi Carbon) | 1 part |
| Isocetyl stearate | 5 parts |
| Stearic acid | 1 part |
| Oleic acid | 1 part |
| Methyl ethyl ketone | 80 parts |
| Cyclohexane | 120 parts |

<Magnetic Coating B>

| Hexagonal barium ferrite | 100 parts |
|---|---|
| Surface treatment: Al$_2$O$_3$ 5 wt %, SiO$_2$ 2 wt % |  |
| Hc: 2500 Oe |  |
| Plate size: 25 nm |  |
| Plate ratio: 3 |  |
| σs: 56 emu/g |  |
| Polyurethane resin PUA-1 | 10 parts |
| α-alumina (HIT60: Sumitomo Chemical) | 4 parts |
| Diamond (average particle size 100 μm) | 2 parts |
| Carbon black (#50: Asahi Carbon) | 1 part |
| Isocetyl stearate | 5 parts |
| Stearic acid | 1 part |
| Oleic acid | 1 part |

-continued

| | |
|---|---|
| Methyl ethyl ketone | 80 parts |
| Cyclohexane | 120 parts |
| <Magnetic Coating C> | |
| Ferromagnetic metal powder | 100 parts |
| Composition: Fe 70%, Co 30% | |
| Hc: 2300 Oe | |
| Major axis length: 0.045 μm | |
| Crystal size: 120 Å | |
| σs: 120 emu/g | |
| Sintering preventives: | |
| Al compound (Al/Fe: atomic ratio 14%) | |
| Y compound (Y/Fe: atomic ratio 7%) | |
| Vinyl chloride copolymer (MR110: Nippon Zeon) | 10 parts |
| Polyurethane resin (UR8200: Toyobo) | 4 parts |
| α-alumina (HIT60: Sumitomo Chemical) | 5 parts |
| Diamond (average particle size 0.1 μm) | 1 part |
| Carbon black (#50: Asahi Carbon) | 1 part |
| Phenylphosphonic acid | 3 parts |
| n-butyl stearate | 3 parts |
| Butoxyethyl stearate | 3 parts |
| Ethyleneglycoldiolete | 6 parts |
| Stearic acid | 1 part |
| Oleic acid | 1 part |
| Methyl ethyl ketone | 140 parts |
| Cyclohexane | 200 parts |
| <Magnetic Coating D> | |
| Ferromagnetic metal powder | 100 parts |
| Composition: Fe 70%, Co 30% | |
| Hc: 2300 Oe | |
| Major axis length: 0.045 μm | |
| Crystal size: 120 Å | |
| σs: 120 emu/g | |
| Sintering preventives: | |
| Al compound (Al/Fe: atomic ratio 14%), | |
| Y compound (Y/Fe: atomic ratio 7%) | |
| Polyurethane resin PUA-1 | 10 parts |
| α-alumina (HIT60: Sumitomo Chemical) | 5 parts |
| Diamond (average particle size 0.1 μm) | 1 part |
| Carbon black (#50: Asahi Carbon) | 1 part |
| Phenylphosphonic acid | 3 parts |
| n-butyl stearate | 3 parts |
| Butoxyethyl stearate | 3 parts |
| Ethyleneglycoldiolete | 6 parts |
| Stearic acid | 1 part |
| Oleic acid | 1 part |
| Methyl ethyl ketone | 140 parts |
| Cyclohexane | 200 parts |
| <Non-magnetic Coating a> | |
| Non-magnetic powder: α-Fe$_2$O$_3$ hematite | 100 parts |
| Major axis length: 0.07 μm | |
| Minor axis length: 0.014 μm | |
| Specific surface area by BET: 55 m$^2$/g | |
| pH: 9 | |
| Surface treatment agent: Al$_2$O$_3$ 8 wt % | |
| Carbon black | 25 parts |
| (average particle size 20 nm, SC-U: Colombian Carbon) | |
| Vinyl chloride copolymer (MR104: Nippon Zeon) | 15 parts |
| Polyurethane resin (UR5500: Toyobo) | 7 parts |
| Phenylphosphonic acid | 4 parts |
| Isocetyl stearate | 6 parts |
| Oleic acid | 1.3 parts |
| Stearic acid | 1.3 parts |
| Methyl ethyl ketone/cyclohexane | 250 parts |
| (8/2 mixed solvent) | |
| <Non-magnetic Coating b> | |
| Non-magnetic powder: α-Fe$_2$O$_3$ hematite | 100 parts |
| Major axis length: 0.07 μm | |
| Minor axis length: 0.014 μm | |
| Specific surface area by BET: 55 m$^2$/g | |
| pH: 9 | |
| Surface treatment agent: Al$_2$O$_3$ 8 wt % | |
| Carbon black | 25 parts |
| (average particle size 20 nm, SC-U: Colombian Carbon) | |

-continued

| | |
|---|---|
| Polyurethane resin PUA-1 | 22 parts |
| Phenylphosphonic acid | 4 parts |
| Isocetyl stearate | 6 parts |
| Oleic acid | 1.3 parts |
| Stearic acid | 1.3 parts |
| Methyl ethyl ketone/cyclohexane | 250 parts |
| (8/2 mixed solvent) | |

[Generation of the Master Carrier]

The substrate of the master carrier employed a Ni substrate, which was generated by a stamper generation method. More specifically, the disk-shaped Ni substrate has a land/groove pattern, in which radial lines with a width of 0.5 μm are arranged between the disk center and a radial position of 20 to 40 mm, and the line pitch is 0.3 μm at the radially innermost position 20 mm away from the disk center. The Ni substrate has a FeCo30 at % layer (soft magnetic layer), which was formed at 25° C. The thickness of the soft magnetic layer is 200 nm, the Ar sputtering pressure is 1.5×10$^{-4}$ Pa (1.08 mTorr), and the applied voltage is 2.80 W/cm$^2$.

(Sample 1)

The ingredients of the magnetic coating A were kneaded with a kneader and dispersed with a sand mill. Similarly, the ingredients of the non-magnetic coating a were kneaded and dispersed. In the dispersed solutions of the magnetic coating A and non-magnetic coating a, 13 parts of polyisocyanate were added to the coating solution of the non-magnetic layer, and 4 parts of polyisocyanate were added to the coating solution of the magnetic layer A. Furthermore, 30 parts of cyclohexane were added to each of the two coating solutions. Next, they were passed through a filter with an average bore diameter of 1 μm. In this way, the coating solution for the non-magnetic layer and the coating solution for the magnetic layer A were prepared.

The obtained non-magnetic layer coating solution was applied on the polyethyleneterephthalate substrate of 62 μm in thickness and 3 nm in center line average height so as to have a thickness of 1.5 μm after drying. Immediately after the application of the non-magnetic layer coating solution, the obtained magnetic layer coating solution was applied on the non-magnetic layer coating solution so as to have a thickness of 0.1 μm after drying. After drying, the magnetic medium was treated at a temperature of 90° C. and a line pressure of 300 kg/cm with a 7-roll calender. The magnetic medium was stamped out to have a diameter of 3.7 in, and the surface was polished. With the master carrier obtained in the above-described method, signals were transferred magnetically to the obtained magnetic medium.

(Sample 2)

Sample 2 is the same as sample 1 except that the polyurethane resin UR8200 in the magnetic coating A is changed to polyurethane resin PUA-1.

(Sample 3)

Sample 3 is the same as sample 1 except that the quantity of the vinyl chloride copolymer MR110 in the magnetic coating A is changed from 7 parts to 1.5 parts and the quantity of the polyurethane resin PUA-1 is changed from 3 parts to 8.5 parts.

(Sample 4)

Sample 4 is the same as sample 1 except that the magnetic coating B is employed instead of the magnetic coating B and the non-magnetic coating b is employed instead of the non-magnetic coating a.

(Samples 5 to 17)

Samples 5 to 17 are the same as sample 1 except that polyurethane resin to be added to the magnetic coating and non-magnetic coating is changed as listed in Table 3.

(Sample 18)
Sample 18 is the same as sample 1 except that the magnetic coating B is employed instead of the magnetic coating A.
(Sample 19)
Sample 19 is the same as sample 1 except that the magnetic coating C is employed instead of the magnetic coating A.
(Sample 20)
Sample 20 is the same as sample 1 except that the magnetic coating D is employed instead of the magnetic coating A and the non-magnetic coating b is employed instead of the non-magnetic coating a.
(Samples 21 to 33)
Samples 21 to 33 are the same as sample 1 except that polyurethane resin to be added to the magnetic coating and non-magnetic coating is changed as listed in Table 3.
The kind of binders of the samples, initial S/N ratio, and quality evaluation by the number of signal-transferred sheets are listed in Table 3. The initial S/N ratio and number of transferred sheets in Table 3 were evaluated by the following methods.

(Initial S/N ratio)
For each of the magnetic media of the obtained samples 1 to 33, a signal with a bit length of 0.3 µm was magnetically transferred by the generated master carriers. After magnetic transfer, a signal was reproduced from each of the magnetic media with an MR head of 0.5 µm in track width, using a RWA1001 type disk evaluation device (GUZIK) and a spin stand LS-90 (Kyodo Electronic Systems). Thereafter, the S/N ratio of each of the reproduced signals was evaluated.
(Quality Evaluation by the Number of Signal-Transferred Sheets)
For each of the magnetic media of the obtained samples 1 to 33, a signal with a bit length of 0.3 µm was magnetically transferred by the generated master carriers. After magnetic transfer, a signal was reproduced from each of the magnetic media with an MR head of 0.5 µm in track width, using a RWA1001 type disk evaluation device (GUZIK) and a spin stand LS-90 (Kyodo Electronic System). The magnetic transfer to the magnetic recording medium was stopped when the level of the reproduced signal (TAA) was 2 dB lower than that of the signal at the starting point. At this time, the number of signal-transferred media was calculated.

TABLE 3

| Sample | Magnetic coating | Non-magnetic coating | Binder Magnetic layer | Binder Non-magnetic layer | Initial S/N (dB) | Number of signal-transferred sheets (×10000) |
|---|---|---|---|---|---|---|
| 1 | A | a | MR110 + UR8200 | MR104 + UR5500 | 20 | 50 |
| 2 | A | a | MR110 + PUA1 | MR104 + UR5500 | 21 | 50 |
| 3 | A | a | MR110 + PUA1 | MR104 + UR5500 | 24 | 100 |
| 4 | B | b | PUA-1 | PUA-1 | 26 | 100< |
| 5 | B | b | PUA-2 | PUA-2 | 26 | 100< |
| 6 | B | b | PUA-3 | PUA-3 | 24 | 100< |
| 7 | B | b | PUA-4 | PUA-4 | 20 | 100< |
| 8 | B | b | PUB-1 | PUB-1 | 20 | 100< |
| 9 | B | b | PUB-2 | PUB-2 | 26 | 100< |
| 10 | B | b | PUB-3 | PUB-3 | 28 | 100< |
| 11 | B | b | PUB-4 | PUB-4 | 26 | 100< |
| 12 | B | b | PUB-5 | PUB-5 | 28 | 100< |
| 13 | B | b | PUB-6 | PUB-6 | 28 | 100< |
| 14 | B | b | PUB-7 | PUB-7 | 28 | 100< |
| 15 | B | b | PUC-1 | PUC-1 | 26 | 100< |
| 16 | B | b | PUC-2 | PUC-2 | 24 | 100< |
| 17 | B | b | PUC-3 | PUC-3 | 20 | 100< |
| 18 | B | b | PUB-3 | MR104 + UR5500 | 24 | 100 |
| 19 | C | a | MR110 + UR8200 | MR104 + UR5500 | 20 | 50 |
| 20 | D | b | PUA-1 | PUA-1 | 26 | 100< |
| 21 | D | b | PUA-2 | PUA-2 | 26 | 100< |
| 22 | D | b | PUA-3 | PUA-3 | 24 | 100< |
| 23 | D | b | PUA-4 | PUA-4 | 20 | 100< |
| 24 | D | b | PUB-1 | PUB-1 | 20 | 100< |
| 25 | D | b | PUB-2 | PUB-2 | 26 | 100< |
| 26 | D | b | PUB-3 | PUB-3 | 28 | 100< |
| 27 | D | b | PUB-4 | PUB-4 | 26 | 100< |
| 28 | D | b | PUB-5 | PUB-5 | 28 | 100< |
| 29 | D | b | PUB-6 | PUB-6 | 28 | 100< |
| 30 | D | b | PUB-7 | PUB-7 | 28 | 100< |
| 31 | D | b | PUC-1 | PUC-1 | 26 | 100< |
| 32 | D | b | PUC-2 | PUC-2 | 24 | 100< |
| 33 | D | b | PUC-3 | PUC-3 | 20 | 100< |

It can be understood from the number of signal-transferred sheets in Table 3 that in the magnetic recording media of the present invention (samples 3 to 18 and 20 to 33), in which polyurethane resin having a specific polar group in the magnetic layer by a predetermined amount is contained a predetermined quantity with respect to the quantity of all resins, corrosion of the magnetic master carrier surface is prevented over a long time. In addition, the dispersibility of the magnetic powder in the magnetic layer is enhanced by polyurethane resin having a specific polar group, so a sufficient S/N ratio can be obtained.

On the other hand, in sample 2 where the quantity of the polyurethane resin with a specific polar group is as low as 30 wt % and samples 1 and 19 which has no polyurethane resin having a specific polar group, the number of signal-transferred sheets is half that of the magnetic recording medium of the present invention and it is contemplated that corrosion has occurred in the master carrier surface.

As described above, in the second magnetic recording medium of the present invention, the magnetic recording layer contains a predetermined quantity of polyurethane resin that has a specific polar group by a predetermined quantity. However, it can be understood from the comparison between the samples 10 and 18 that if the non-magnetic layer also contains the polyurethane resin, corrosion of the master carrier surface can be prevented over a longer time.

As set forth above, in the second flexible magnetic recording medium of the present invention, the magnetic layer includes polyurethane resin which contains in a range of 0.05 to 0.7 meq/g at least one kind of polar group selected from the group consisting of —$SO_3M$, —$OSO_3M$, —$P=O(OM)_2$, —$O-P=O(OM)_2$, and —COOH (where M represents a hydrogen atom, alkali metals, or an ammonium salt). The polyurethane resin content is 60 wt % or greater of the quantity of all resins in the magnetic layer. Therefore, it becomes possible to achieve the long-term stability of the quality of signals recorded on the magnetic recording medium. In addition, polyurethane resin with a high polar group content is employed a predetermined quantity or greater. Therefore, it becomes possible to obtain a sufficient S/N ratio.

Now, a description will be given of a third flexible magnetic recording medium. The third flexible magnetic recording medium is a flexible magnetic recording medium to which data is transferred by being brought into intimate contact with a master carrier which has a land/groove pattern corresponding to said data. The third magnetic recording medium comprises a non-magnetic substrate, and a non-magnetic layer, and a magnetic layer. The non-magnetic layer and the magnetic layer are coated on the substrate in the recited order. The relationship between the Moh's hardness (X) of the surface of the master carrier and the Knoop hardness (Y kg/mm$^2$) of the surface of the magnetic recording medium is represented as $1 \leq Y/X \leq 7$.

The relationship between the Moh's hardness (X) of the surface of the master carrier and the Knoop hardness (Y kg/mm$^2$) of the surface of the magnetic recording medium is in a range of $1 \leq Y/X \leq 7$, preferably $2 \leq Y/X \leq 5$. In the case where Y/X is less than 1 or greater than 8, magnetic transfer cannot be performed in a good state of contact with the master carrier and it is difficult to enhance signal quality. In addition, in the case where Y/X is greater than 8, flaws will occur in the master carrier if magnetic transfer is repeatedly performed. Consequently, a sufficient number of magnetic recording media cannot be obtained.

In the third magnetic recording medium, the Knoop hardness of the surface is adjusted according the Moh's hardness of the master carrier surface so that it is in a range of $1 \leq Y/X \leq 7$. For instance, to make the Knoop hardness of the surface of the magnetic recording medium greater, it is necessary to enhance the bridge density of a coating by increasing the quantity of a hardening agent to be added to the underlying layer and magnetic layer of the magnetic recording medium, to employ a binder whose glass transition temperature Tg is high, or to enhance the fill density of the magnetic substance in the surface of the magnetic recording medium by increasing the temperature and pressure in a calendering treatment. However, the material of the magnetic recording medium and the fabrication method are not particularly limited as long as the relationship of $1 \leq Y/X \leq 7$ is obtained.

As a preferred example, a description will be given of a magnetic recording medium that has a practically non-magnetic layer (underlying layer), and a magnetic layer formed on the non-magnetic layer and having ferromagnetic powder or ferromagnetic hexagonal ferrite powder distributed in a binder. In this magnetic recording medium, the thickness of the magnetic layer can be made 0.5 µm or less. In addition, it has high mechanical strength and is excellent in surface smoothness. Therefore, if this magnetic recording medium is employed, a magnetic recording medium with a high recording density and high durability can be obtained.

[Magnetic Layer]

A description of the magnetic layer is omitted because it is the same as the contents described in the [Magnetic Layer] of the first flexible magnetic recording medium.

(Ferromagnetic Powder)

A description of the ferromagnetic powder is omitted because it is the same as the contents described in the (Ferromagnetic Powder) of the first flexible magnetic recording medium.

(Abrasives)

The magnetic layer of the magnetic recording medium may contain known abrasives. Among them, diamond and alumina particles are preferred. Abrasives other than the above-described abrasives may be used together. Such abrasives are silicon carbide, chromium oxide, serium oxide, α-iron oxide, corundum, silicon nitride, titanium carbide, titanium oxide, silicon dioxide, boron nitride, etc. These abrasives with a Moh's hardness of 6 or greater can be employed singly or in combination. These abrasives may be added to the underlying layer as necessary. If an abrasive is added to the underlying layer, the surface shape can be controlled, or the state of protrusion of the abrasive can be controlled. The particle size and quantity of an abrasive that is added to the magnetic layer and underlying layer should be set to optimum values.

(Carbon Black in the Magnetic Layer)

A description of the carbon black in the magnetic layer is omitted because it is the same as the contents described in the (Carbon Black in the Magnetic Layer) of the first flexible magnetic recording medium.

[Non-Magnetic Layer (Underlying Layer)]

A description of the non-magnetic layer (underlying layer) is omitted because it is the same as the contents described in the [Non-Magnetic Layer (Underlying Layer)] of the first flexible magnetic recording medium.

(Non-Magnetic Powder)

A description of the non-magnetic powder is omitted because it is the same as the contents described in the (Non-Magnetic Powder) of the first flexible magnetic recording medium.

(Carbon Black, etc. in the Underlying Layer)

A description of the carbon black, etc. in the underlying layer is omitted because it is the same as the contents described in the (Carbon Black, etc. in the Underlying Layer) of the first flexible magnetic recording medium.

[Binders]

A description of the binders is omitted because it is the same as the contents described in the [Binders] of the first flexible magnetic recording medium.

[Additives]

A description of the additives is omitted because it is the same as the contents described in the [Additives] of the first flexible magnetic recording medium.

Note that the whole or part of an additive may be added in any step of fabricating magnetic and non-magnetic coatings. In addition, after formation of the magnetic layer, the whole or part of an additive may be applied at the same time or in order, depending on the object.

[Layer Construction]

A description of the layer construction is omitted because it is the same as the contents described in the [Layer Construction] of the first flexible magnetic recording medium.

[Substrate]

A description of the substrate is omitted because it is the same as the contents described in the [Substrate] of the first flexible magnetic recording medium.

[Method of Fabricating the Magnetic Recording Medium]

The method of fabricating the fourth flexible magnetic recording medium of the present invention includes the preparation of a coating solution for forming each layer, application of the coating solution to the substrate, orientation treatment, drying, cooling, calendering, stamping, post-hardening, polishing, assembly, etc.

The step of generating the magnetic coating and non-magnetic coating of the magnetic recording medium includes at least a kneading step, a dispersion step, and mixing steps provided before and after these steps as necessary. Each step may be performed in two or more stages. Ferromagnetic powder, non-magnetic powder, a binder, carbon black, an abrasive, an antistatic agent, a lubricant, and a solvent may be added at the beginning or in the middle of any step. In addition, each material may be divided and added in two or more steps. For example, polyurethane may be divided and added in the kneading step, the dispersion step, and the mixing step for adjusting viscosity after dispersion.

The magnetic coating and non-magnetic coating are kneaded and dispersed by various kneaders. Examples of kneaders are a two-roll mill, a three-roll mill, a ball mill, a pebble mill, a revolving mill, a sand grinder, a szegvari, a high-speed impeller disperser, a high-speed stone mill, a high-speed impact mill, a disperser, a kneader, a high-speed mixer, a homogenizer, an ultrasonic disperser, etc.

A method for applying a coating solution is not particularly limited. It is preferable to apply a non-magnetic layer coating solution on a substrate, dry the solution, and apply a magnetic layer coating solution. Such a sequential multiple application method, that is, a wet-on-dry method, can employ a conventional one. Preferred examples are methods disclosed in Japanese Unexamined Patent Publication Nos. 3(1991)-214417 and 3(1991)-214422.

A surface smoothing process can be performed by a calender, etc. The calender rolls may be formed from a plastic material, which has a heat resisting property, such as epoxy, polyimide, polyamide, polyimideamide, etc. In the calendering process, the line pressure is in a range of 50 to 500 kg/cm, preferably 100 to 400 kg/cm, and the temperature is in a range of 20 to 130° C., preferably 40 to 120° C.

The master carrier that is employed in performing magnetic transfer is a conventional one. The construction, material, and fabrication method of the master carrier are not limited.

[Third Embodiment]

Now, a third embodiment of the present invention will be described in further detail. Note in the embodiment that the word "part" or "parts" represents "weight part" or "weight parts."

[Generation of Master Carriers]

(Sample A)

The substrate of a master carrier employed a Ni substrate, which was generated by a stamper generation method. More specifically, the disk-shaped Ni substrate has a land/groove pattern, in which radial lines with a width of 0.5 $\mu$m are arranged between the disk center and a radial position of 20 to 40 mm, and the line pitch is 0.3 $\mu$m at the radially innermost position 20 mm away from the disk center.

The Ni substrate has a FeCo30at % layer (soft magnetic layer), which was formed at 25° C. The layer thickness of the soft magnetic layer is 200 nm, the Ar sputtering pressure is $1.5 \times 10^{-4}$ Pa (1.08 mTorr), and the applied voltage is 2.80 W/cm$^2$. The Moh's hardness of the surface of the master carrier obtained is 4.

(Sample B)

In the master carrier of sample A, the surface was treated with an oxygen plasma to obtain a Moh's hardness of 6. The oxygen partial pressure is $7.5 \times 10^{-5}$ Pa (0.54 mTorr).

(Sample C)

In the master carrier of sample A, the surface was provided with a diamond-like carbon (DLC) coating to obtain a Moh's hardness of 9.5.

[Generation of the Magnetic Recording Medium]

The materials of a coating (magnetic coating) for the magnetic layer and a coating (non-magnetic coating) for the non-magnetic underlying layer were prepared as listed below. The quantity of each ingredient is a quantity per 100 weight parts of ferromagnetic metal powder or non-magnetic powder.

| | |
|---|---|
| <Magnetic Coating A> | |
| Hexagonal barium ferrite | 100 parts |
| Surface treatment: Al$_2$O$_3$ 5 wt %, SiO$_2$ 2 wt % | |
| Hc: 3000 Oe | |
| Plate size: 25 nm | |
| Plate ratio: 3 | |
| σs: 56 emu/g | |
| Vinyl chloride copolymer (MR110: Nippon Zeon) | 6 parts |
| Polyurethane resin (UR8200: Toyobo) | 3 parts |
| α-alumina (HIT60: Sumitomo Chemical) | 5 parts |
| Diamond (average particle size 0.15 $\mu$m) | 1 part |
| Carbon black (#50: Asahi Carbon) | 1 part |
| Isocetyl stearate | 5 parts |
| Stearic acid | 1 part |
| Oleic acid | 1 part |
| Methyl ethyl ketone | 80 parts |
| Cyclohexane | 120 parts |
| <Magnetic Coating B> | |
| Ferromagnetic metal powder | 100 parts |
| Composition: Fe 70%, Co 30% | |
| Hc: 2300 Oe | |
| Major axis length: 0.045 $\mu$m | |
| Crystal size: 120 Å | |
| σs: 150 emu/g | |
| Sintering preventives: | |
| Al compound (Al/Fe: atomic ratio 14%), | |
| Y compound (Y/Fe: atomic ratio 7%) | |
| Vinyl chloride copolymer (MR110: Nippon Zeon) | 10 parts |
| Polyurethane resin (UR8200: Toyobo) | 4 parts |
| α-alumina (HIT60: Sumitomo Chemical) | 5 parts |
| Diamond (average particle size 0.15 $\mu$m) | 1 part |
| Carbon black (#50: Asahi Carbon) | 1 part |
| Phenylphosphonic acid | 3 parts |
| Isocetyl stearate | 5 parts |
| Stearic acid | 1 part |
| Oleic acid | 1 part |
| Methyl ethyl ketone | 140 parts |
| Cyclohexane | 200 parts |

-continued

<Non-magnetic Coating>

| | |
|---|---|
| Non-magnetic powder: TiO₂ crystal rutile | 100 parts |
| Average primary particle size: 0.035 μm | |
| Specific surface area by BET: 40 m²/g | |
| pH: 7; TiO₂ content: 90% or greater | |
| DBP oil absorption 27 to 38 ml/100 g | |
| Surface treatment agent: Al₂O₃, SiO₂ | |
| Carbon black (EC) | 13 parts |
| Vinyl chloride copolymer (MR110: Nippon Zeon) | 17 parts |
| Polyurethane resin (UR8600: Toyobo) | 6 parts |
| Phenylphosphonic acid | 3 parts |
| Isocetyl stearate | 6 parts |
| Oleic acid | 1 part |
| Stearic acid | 1 part |
| Methyl ethyl ketone | 120 parts |
| Cyclohexane | 180 parts |

(Sample 1)

The ingredients of the magnetic coating A were kneaded with a kneader and dispersed with a sand mill. Similarly, the ingredients of the non-magnetic coating were kneaded and dispersed. In the dispersed solutions of the magnetic coating A and non-magnetic coating, 13 parts of polyisocyanate were added to the coating solution of the non-magnetic layer, and 4 parts of polyisocyanate were added to the coating solution of the magnetic layer A. Furthermore, 30 parts of cyclohexane were added to each of the two coating solutions. Next, they were passed through a filter with an average bore diameter of 1 μm. In this way, the coating solution for the non-magnetic layer and the coating solution for the magnetic layer A were prepared.

The obtained non-magnetic layer coating solution was applied on the polyethyleneterephthalate substrate of 62 μm in thickness and 3 nm in center line average height so as to have a thickness of 1.5 μm after drying. After the application of the non-magnetic layer coating solution, the obtained magnetic layer coating solution was applied on the non-magnetic layer coating solution so as to have a thickness of 0.1 μm after drying. After drying, the magnetic medium was treated at a temperature of 90° C. and a line pressure of 300 kg/cm with a 7-roll calender. The magnetic medium was stamped out to have a diameter of 3.7 in, and the surface was polished. In this way, a 3.7-in magnetic recording medium was obtained.

(Sample 2)

Sample 2 (magnetic recording medium) is the same as sample 1 except that 2 parts of polyisocyanate is added to the magnetic coating A and 4 parts of polyisocyanate is added to the non-magnetic coating.

(Sample 3)

Sample 3 (magnetic recording medium) is the same as sample 1 except that 10 parts of polyisocyanate is added to the magnetic coating A and 20 parts of polyisocyanate is added to the non-magnetic coating.

(Sample 4)

Sample 4 (magnetic recording medium) is the same as sample 1 except that the temperature in the calendering treatment is changed to 70° C.

(Sample 5)

Sample 5 (magnetic recording medium) is the same as sample 1 except that the temperature in the calendering treatment is changed to 100° C.

(Sample 6)

Sample 6 (magnetic recording medium) is the same as sample 1 except that the magnetic coating A is changed to the magnetic coating B.

(Sample 7)

Sample 7 (magnetic recording medium) is the same as sample 6 except that 2 parts of polyisocyanate is added to the magnetic coating B and 4 parts of polyisocyanate is added to the non-magnetic coating.

(Sample 8)

Sample 8 (magnetic recording medium) is the same as sample 6 except that 10 parts of polyisocyanate is added to the magnetic coating B and 20 parts of polyisocyanate is added to the non-magnetic coating.

The obtained master carriers A to C and samples 1 to 8 are combined as listed in Table 4, and a signal with a bit length of 0.3 μm was magnetically transferred. The Knoop hardness Y of the surface of the sample, Moh's hardness X of the master carrier, Y/X, S/N ratio, and the number of signal-transferred sheets are listed in Table 4. The S/N ratio and number of transferred sheets in Table 4 were evaluated by the following methods.

(S/N ratio)

The magnetically transferred signal with a bit length of 0.3 μm was reproduced with an MR head of 0.5 μm in track width, using a RWA1001 type disk evaluation device (GUZIK) and a spin stand LS-90 (Kyodo Electronic Systems). Thereafter, the S/N ratio was evaluated.

(Quality Evaluation by the Number of Signal-Transferred Sheets)

For each of the magnetic media of the samples 1 to 8 having a signal with a bit length of 0.3 μm, a servo signal was magnetically transferred. The magnetic transfer to the magnetic recording medium was stopped when the level of the reproduced servo signal was 2 dB lower than that of the signal at the starting point. At this time, the number of signal-transferred media was calculated.

TABLE 4

| | Master carrier | | Magnetic recording medium | | | | Number of signal-transferred sheets (×10000) |
|---|---|---|---|---|---|---|---|
| Level | Sample | Moh's hardness | Sample | (Y) (kg/mm²) | Y/X value | S/N (dB) | |
| 1 | B | 6 | 1 | 20 | 3.3 | 28 | 100< |
| 2 | B | 6 | 2 | 10 | 1.7 | 29 | 100< |
| 3 | B | 6 | 3 | 45 | 7.5 | 20 | 50 |
| 4 | B | 6 | 4 | 15 | 2.5 | 28 | 100< |
| 5 | B | 6 | 5 | 40 | 6.7 | 26 | 100< |
| 6 | B | 6 | 6 | 25 | 4.2 | 27 | 100< |
| 7 | B | 6 | 7 | 15 | 2.5 | 28 | 100< |

TABLE 4-continued

| | Master carrier | | Magnetic recording medium | | | | Number of signal-transferred |
|---|---|---|---|---|---|---|---|
| | | | Knoop hardness | | | | |
| Level | Sample | Moh's hardness | Sample | (Y) (kg/mm²) | Y/X value | S/N (dB) | sheets (×10000) |
| 8 | B | 6 | 8 | 50 | 8.3 | 16 | 30 |
| 9 | A | 4 | 1 | 20 | 5.0 | 27 | 100< |
| 10 | A | 4 | 2 | 10 | 2.5 | 28 | 100< |
| 11 | A | 4 | 3 | 45 | 11.3 | 20 | 20 |
| 12 | A | 4 | 4 | 15 | 3.8 | 27 | 100< |
| 13 | A | 4 | 5 | 40 | 10.0 | 22 | 30 |
| 14 | C | 9.5 | 1 | 20 | 2.1 | 30 | 100< |
| 15 | C | 9.5 | 2 | 10 | 1.1 | 30 | 100< |
| 16 | C | 9.5 | 3 | 45 | 4.7 | 28 | 100< |
| 17 | C | 9.5 | 4 | 15 | 1.6 | 29 | 100< |
| 18 | C | 9.5 | 5 | 40 | 4.2 | 28 | 100< |

It can be understood from the number of signal-transferred sheets in Table 4 that in the magnetic recording media of the present invention (levels 1, 2, 4 to 7, 9, 10, 12, and 14 to 18), which has the relationship of $1 \leq Y/X \leq 7$, the contact between the master carrier and the magnetic recording medium is sufficient. The signal dropouts during magnetic transfer are reduced. As a result, signal quantity can be enhanced, and a sufficient S/N ratio can be obtained.

On the other hand, in the magnetic recording media (levels 3, 8, 11, and 13) where Y/X is greater than the above-described range, the contact between the master carrier and the magnetic recording medium is not sufficient. As a result, signal dropouts occurred during magnetic transfer. Sufficient signal quantity and a sufficient S/N ratio were not obtained.

As set forth above, in the above-described third flexible magnetic recording medium, the relationship between the Moh's hardness (X) of the surface of the master carrier and the Knoop hardness (Y kg/mm²) of the surface of the magnetic recording medium is represented as $1 \leq Y/X \leq 7$. Therefore, the intimate contact between the master carrier and the magnetic recording medium can be made sufficient. As a result, signal dropouts can be prevented from occurring in magnetic data transferred to the magnetic recording medium, and signal quantity can be enhanced.

Now, a description will be given of a fourth flexible magnetic recording medium. In the fourth flexible magnetic recording medium, a first coating solution for forming the non-magnetic layer contains a first lubricant in a range of 1 to 20 wt % of non-magnetic powder contained in the non-magnetic layer. A second coating solution for forming the magnetic layer contains a second lubricant which is ¼ or less of the first lubricant in quantity. The first and second lubricants are liquids at a temperature at which the magnetic transfer is performed.

The temperature at which the magnetic transfer is performed is 20 to 25° C. The above-described lubricants are not limited if they are liquids at the above-described temperature. For example, fatty acid ester is preferable.

Fatty acid ester can employ fatty acid esters, which consist of monobasic fatty acids of carbon numbers 10 to 20 and monohydric alcohols of carbon numbers 3 to 12.

Examples of alcohols that are used as the material of fatty acid ester is monohydric alcohol (such as ethanol, butanol, phenol, benzyl alcohol, 2-methyl butyl alcohol, 2-hexyl decil alcohol, propylene glycol monobutyl ether, ethylene glycol monobutyl ether, dipropylene glycol monobutyl ether, diethylene glycol monobutyl ether, s-butyl alcohol, etc.), and polyhydric alcohol (such as ethylene glycol, diethylene glycol, neopentyl glycol, glycerin, and sorbitan derivatives).

Examples of fatty acids are acetic acid, propionic acid, octanoic acid, 2-ethyl hexanoic acid, lauric acid, myristic acid, stearic acid, palmitic acid, behenic acid, arachic acid, oleic acid, linoleic acid, linolenic acid, elaidic acid, aliphatic carboxylic acid such as palmitoleic acid, and a mixture of them.

Examples of fatty acid esters are butyl stearate, s-butylstearate, isopropylstearate, butyloleate, amylstearate, 3-methyl butyl stearate, 2-ethyl hexyl stearate, 2-hexyl decil stearate, butyl palmitato, 2-ethyl hexyl myristate, a mixture of butyl stearate and butyl palmitato, butoxy ethyl stearate, 2-butoxy-1-propyl stearate, dipropylene glycol monobutyl ether acylated with stearic acid, diethyl glycol dipalmitato, hexamethylenediol acylated with myristic acid and diesterified, and ester compounds such as an oleate of glycerin.

When magnetic recording media are used under high humidity, the hydrolysis of fatty acid ester often occurs. To alleviate this hydrolysis, it is preferable to select the isometric structure and branch position, such as the branch, straight chain, cis-trans, etc., of fatty acid and alcohol.

An organic solvent that is employed in the present invention can use, at an arbitrary ratio, ketones (such as acetone, methyl ethyl ketone, diisobutyl ketone, cyclohexanon, isoboron, and tetrahydrofuran); alcohols (such as methanol, ethanol, propanol, butanol, isobutyl alcohol, isopropyl alcohol, and methyl cyclohexanol); esters (such as methyl acetate, butyl acetate, isobutyl acetate, isopropyl acetate, ethyl lactate, and glycol acetate); glycol ether systems (such as glycol dimethyl ether, glycol monoethyl ether, dioxane); aromatic hydrocarbons (such as benzen, toluene, xylene, cresol, and chlorobenzen); chlorinated hydrocarbons (such as methylene chloride, ethylene chloride, carbon tetrachloride, chloroform, ethylene chlorohydrin, and dichlorobenzen); N,N-dimethyl formaldehyde; hexane; and so on. These organic solvents do not always need to be 100% pure. The organic solvents, in addition to their main ingredient, may contain impurities such as a metamer, an unreacted product, a side reaction production, a decomposition product, an oxide, moisture, etc. These impurities are preferably 30 wt % or less and further preferably 10 wt % or less.

The organic solvent that is employed in the present invention may vary in kind and quantity between the magnetic layer and the non-magnetic layer. For instance, the magnetic layer may contain a solvent with a high volatility to enhance surface stability. The non-magnetic layer may contain a solvent with a high surface tension (cyclohexane, dioxane, etc.) to enhance the stability of a coating, or may contain a solvent with a high solubility to increase its fill amount.

The fourth magnetic recording medium of the present invention is basically the same in construction as known magnetic recording media except that the above-described lubricant is contained in the magnetic layer and non-magnetic layer by a predetermined quantity. Among them, a magnetic recording medium can be suitably employed that has a practically non-magnetic layer (underlying layer), and a magnetic layer formed on the non-magnetic layer and having ferromagnetic powder or ferromagnetic hexagonal ferrite powder distributed in a binder. In this magnetic recording medium, the thickness of the magnetic layer can be made 0.5 μm or less. In addition, it has high mechanical strength and is excellent in surface smoothness. Therefore, if this magnetic recording medium is employed, a magnetic recording medium with a high recording density and high durability can be obtained.

A preferred example of this magnetic recording medium will hereinafter be described in detail.

[Magnetic Layer]

A description of the magnetic layer is omitted because it is the same as the contents described in the [Magnetic Layer] of the first flexible magnetic recording medium.

(Ferromagnetic Powder)

A description of the ferromagnetic powder is omitted because it is the same as the contents described in the (Ferromagnetic Powder) of the first flexible magnetic recording medium.

(Abrasives)

A description of the abrasives is omitted because it is the same as the contents described in the (Abrasives) of the third flexible magnetic recording medium.

(Carbon Black in the Magnetic Layer)

A description of the carbon black in the magnetic layer is omitted because it is the same as the contents described in the (Carbon Black in the Magnetic Layer) of the first flexible magnetic recording medium.

[Non-Magnetic Layer (Underlying Layer)]

A description of the non-magnetic layer (underlying layer) is omitted because it is the same as the contents described in the [Non-Magnetic Layer (Underlying Layer)] of the first flexible magnetic recording medium.

(Non-Magnetic Powder)

A description of the non-magnetic powder is omitted because it is the same as the contents described in the (Non-Magnetic Powder) of the first flexible magnetic recording medium.

(Carbon Black, etc. in the Underlying Layer)

A description of the carbon black, etc. in the underlying layer is omitted because it is the same as the contents described in the (Carbon Black, etc. in the Underlying Layer) of the first flexible magnetic recording medium.

[Binders]

A description of the binders is omitted because it is the same as the contents described in the [Binders] of the first flexible magnetic recording medium.

[Additives]

A description of the additives is omitted because it is the same as the contents described in the [Additives] of the first flexible magnetic recording medium.

The magnetic layer and underlying layer of the magnetic recording medium, in addition to the aforementioned lubricants, may contain a wide variety of additives having an static charge prevention effect, a dispersion effect, a plastic effect, etc. Examples are silicon oil; silicon oil with a polar group; fatty acid modified silicon; fluorine-contained silicon; fluorine-contained alcohol; fluorine-contained ester; polyolefin; polyglycol; alkylphosphate and an alkali metal salt thereof; alkylsalfate and an alkali metal salt thereof; polyphenylether; phenylphosphonic acid; α-naphthyphosphoric acid; phenylphosphoric acid; diphenylphosphoric acid; p-ethylbenzenphosphonic acid; phenylhosphinic acid; aminoquinones; various silane coupling agent; titan coupling agent; and fluorine-contained alkylsalfate and an alkali metal salt thereof.

All or some of the above-described additives may be added in the step of generating magnetic and non-magnetic coatings. For example, there are a case where additives are mixed with a magnetic substance before a kneading step, a case where additives are added in a step of kneading a magnetic substance, a binder, and an organic solvent, a case where additives are added in a dispersion step, a case where additives are added after dispersion, and a case where additive are added immediately before coating. In addition, after formation of the magnetic layer, all or some of additives may be used at the same time or in sequence, depending on the objects.

[Layer Construction]

A description of the layer construction is omitted because it is the same as the contents described in the [Layer Construction] of the first flexible magnetic recording medium.

[Substrate]

A description of the substrate is omitted because it is the same as the contents described in the [Substrate] of the first flexible magnetic recording medium.

[Method of Fabricating the Magnetic Recording Medium]

The method of fabricating the second flexible magnetic recording medium of the present invention includes the preparation of a coating solution for forming each layer, application of the coating solution to the substrate, orientation treatment, drying, cooling, calendering, stamping, post-hardening, polishing, assembly, etc.

The step of generating the magnetic coating and non-magnetic coating of the magnetic recording medium includes at least a kneading step, a dispersion step, and mixing steps provided before and after these steps as necessary. Each step may be performed in two or more stages. Ferromagnetic powder, non-magnetic powder, a binder, carbon black, an abrasive, an antistatic agent, a lubricant, and a solvent may be added at the beginning or in the middle of any step. In addition, each material may be divided and added in two or more steps. For example, polyurethane may be divided and added in the kneading step, the dispersion step, and the mixing step for adjusting viscosity after dispersion.

The magnetic coating and non-magnetic coating are kneaded and dispersed by various kneaders. Examples of kneaders are a two-roll mill, a three-roll mill, a ball mill, a pebble mill, a revolving mill, a sand grinder, a szegvari, a high-speed impeller disperser, a high-speed stone mill, a high-speed impact mill, a disperser, a kneader, a high-speed mixer, a homogenizer, an ultrasonic disperser, etc.

A method for applying a coating solution is not particularly limited. In a preferred method, a first coating solution for the non-magnetic layer is first applied on the substrate to form a non-magnetic layer. After the non-magnetic layer is dried, a second coating solution for the magnetic layer is applied on the non-magnetic layer (i.e., wet-on-wet application). Then, drying is performed and a surface formation treatment is performed. In the wet-on-wet application method, the thickness of the magnetic layer can be made uniform.

The surface formation treatment can be performed by a calender. The calender rolls are formed from a plastic material, which has a heat resisting property, such as epoxy, polyimide, polyamide, polyimideamide, etc. The line pressure is in a range of 50 to 500 kg/cm, preferably 100 to 400 kg/cm. The temperature is in a range of 20 to 130° C., preferably 40 to 120° C.

Figure 2A:
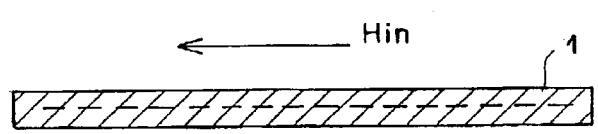
FIG. 2A is a diagram showing the state in which a magnetic field is applied to a magnetic recording medium in one direction to perform direct magnetization.
Figure 2B:
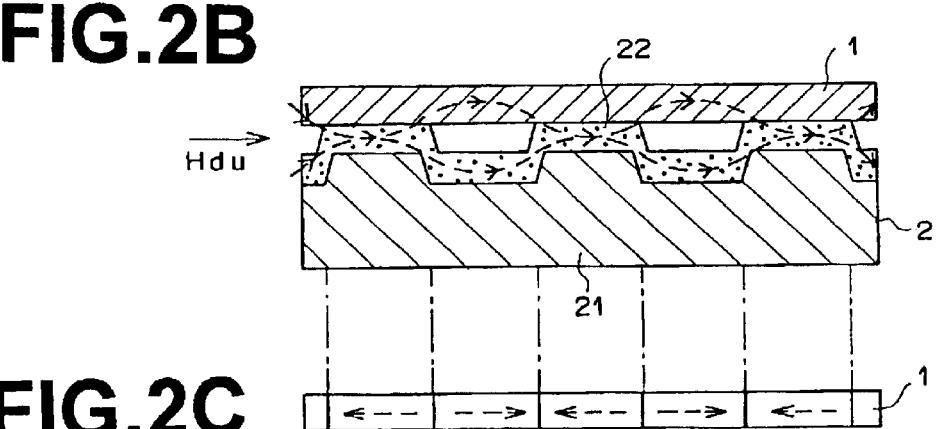
FIG. 2B is a diagram showing the state in which a master carrier is brought into intimate contact with the magnetic recording medium and a magnetic field is applied in the opposite direction.
Figure 2C:
FIG. 2C is a diagram showing the state in which a land/groove pattern formed in the master carrier is transferred magnetically to the magnetic recording medium.

Next, a description will be given of a method for preformatting a magnetic recording medium by magnetic transfer, utilizing a master carrier. As shown in FIG. 2A, an initializing field $H_{in}$ is first applied to a magnetic recording medium 1 in one direction along the direction of the data track to perform initial magnetization. Next, as shown in FIG. 2B, the magnetic recording surface of the magnetic recording medium 1 and the soft magnetic layer 22 of the microscopic land/groove pattern of the metal disk 21 of a master carrier 2 are brought into intimate contact with each other. In this state, a transfer field $H_{du}$ is applied in the opposite direction from the direction of the initializing direction to perform magnetic transfer. As a result, as shown in FIG. 2C, data corresponding to the land/groove pattern of the master carrier 2 is transferred magnetically to the recording surface (data track) of the magnetic recording medium 1. Such a magnetic transfer method is disclosed, for example, in Japanese Unexamined Patent Publication No. 11(1999)-117800.

It is preferable that the preformatted magnetic recording medium be treated with heat. For example, the preformatted magnetic recording medium is held for 1 to 96 hours (preferably 24 to 48 hours) at temperatures in a range of 30 to 120° C. (preferably 50 to 100° C.) after magnetic transfer. With such a heat treatment, the lubricant contained in the non-magnetic layer is easily moved to the surface (magnetic layer) of the magnetic recording medium, and therefore, the durability and flaw-resisting property of the magnetic recording medium can be enhanced. After data is magnetically transferred by the master carrier, a lubricant is moved to the surface (magnetic layer) of the magnetic recording medium. As a result, the lubricant in the magnetic recording medium is prevented from being moved to the master carrier, and the long-term stability of the quality of signals recorded on the magnetic recording medium can be achieved. With the lubricant moved to the magnetic layer, the object of enhancing the durability and flaw-resisting property of the magnetic recording medium can be achieved.

[Fourth Embodiment]

Now, a fourth embodiment of the present invention and comparative examples will be described in further detail. Note in the embodiment that the word "part" or "parts" represents "weight part" or "weight parts."

The materials of a coating (magnetic coating) for the magnetic layer and a coating (non-magnetic coating) for the non-magnetic underlying layer were prepared as listed below. The quantity of each ingredient is a quantity per 100 weight parts of ferromagnetic metal powder or non-magnetic powder.

<Magnetic Coating A>

| | |
|---|---|
| Ferromagnetic metal powder | 100 parts |
| Composition: Fe 70%, Co 30% | |
| Hc: 2300 Oe | |
| Major axis length: 0.045 μm | |
| Crystal size: 120 Å | |
| σs: 150 emu/g | |
| Sintering preventives: | |
| Al compound (Al/Fe: atomic ratio 14%), | |
| Y compound (Y/Fe: atomic ratio 7%) | |
| Vinyl chloride copolymer (MR110: Nippon Zeon) | 10 parts |
| Polyurethane resin (UR8200: Toyobo) | 4 parts |
| α-alumina (HIT60: Sumitomo Chemical) | 5 parts |
| Diamond (particle size 0.15 μm) | 1 part |
| Carbon black (#50: Asahi Carbon) | 1 part |
| Phenylphosphonic acid | 3 parts |
| Isocetyl stearate | 5 parts |
| Stearic acid | 1 part |
| Oleic acid | 1 part |
| Methyl ethyl ketone | 140 parts |
| Cyclohexane | 200 parts |

<Magnetic Coating B>

| | |
|---|---|
| Hexagonal barium ferrite | 100 parts |
| Surface treatment: Al$_2$O$_3$ 5 wt %, SiO$_2$ 2 wt % | |
| Hc: 3000 Oe | |
| Plate size: 25 nm | |
| Plate ratio: 3 | |
| σs: 56 emu/g | |
| Vinyl chloride copolymer (MR110: Nippon Zeon) | 6 parts |
| Polyurethane resin (UR8200: Toyobo) | 3 parts |
| α-alumina (HIT60: Sumitomo Chemical) | 5 parts |
| Diamond (average particle size 0.1 μm) | 1 part |
| Carbon black (#50: Asahi Carbon) | 1 part |
| Isocetyl stearate | 5 parts |
| Stearic acid | 1 part |
| Oleic acid | 1 part |
| Methyl ethyl ketone | 80 parts |
| Cyclohexane | 120 parts |

<Non-magnetic Coating>

| | |
|---|---|
| Non-magnetic powder: TiO$_2$ crystal rutile | 100 parts |
| Average primary particle size: 0.035 μm | |
| Specific surface area by BET: 40 m$^2$/g | |
| pH: 7; TiO$_2$ content: 90% or greater | |
| DBP oil absorption 27 to 38 ml/100 g | |
| Surface treatment agent: Al$_2$O$_3$, SiO$_2$ | |
| Carbon black (EC) | 13 parts |
| Vinyl chloride copolymer (MR110: Nippon Zeon) | 17 parts |
| Polyurethane resin (UR8600: Toyobo) | 6 parts |
| Phenylphosphonic acid | 3 parts |
| Isocetyl stearate | 6 parts |
| Oleic acid | 1 part |
| tearic acid | 1 part |
| Methyl ethyl ketone | 120 parts |
| Cyclohexane | 180 parts |

[Generation of the Master Carrier]

The substrate of the master carrier employed a Ni substrate, which was generated by a stamper generation method. More specifically, the disk-shaped Ni substrate has a land/groove pattern, in which radial lines with a width of 0.5 μm are arranged between the disk center and a radial position of 20 to 40 mm, and the line pitch is 0.3 μm at the radially innermost position 20 mm away from the disk center. The Ni substrate has a FeCo30at % layer (soft magnetic layer), which was formed at 25° C. The thickness of the soft magnetic layer is 200 nm, the Ar sputtering pressure is $1.5 \times 10^{-4}$ Pa (1.08 mTorr), and the applied voltage is 2.80 W/cm$^2$.

(Sample 1)

The ingredients of the magnetic coating A were kneaded with a kneader and dispersed with a sand mill. Similarly, the ingredients of the magnetic coating B and the ingredients of the non-magnetic coating were kneaded and dispersed. In the dispersed solutions of the magnetic coatings A and B and the non-magnetic coating, 13 parts of polyisocyanate were added to the coating solution of the non-magnetic layer, and 4 parts of polyisocyanate were added to the coating solution of the magnetic layer A. 5 parts of polyisocyanate were added to the coating solution of the magnetic layer B. Furthermore, 30 parts of cyclohexane were added to each of the three coating solutions. Next, they were passed through a filter with an average bore diameter of 1 µm. In this way, the coating solution for the non-magnetic layer and the coating solutions for the magnetic layers A and B were prepared.

The non-magnetic layer coating solution, obtained on the polyethyleneterephthalate substrate of 62 µm in thickness and 3 nm in center line average height, was applied to have a thickness of 1.5 µm after drying. After drying, the obtained magnetic layer coating solutions were sequentially applied on the non-magnetic layer coating solution so as to obtain a thickness of 0.1 µm after drying. After drying, the magnetic medium was treated at a temperature of 90° C. and a line pressure of 300 kg/cm with a 7-roll calender. The magnetic medium was stamped out so as to have a diameter of 3.7 in, and the surface was polished. With a magnetic transfer device described below, a servo signal was transferred magnetically to the obtained magnetic medium. After magnetic transfer, the medium was inserted into a 3.7-in cartridge with a liner installed inside (Zip-disk cartridge produced by Iomega), and predetermined mechanical parts were operated. In this way, a 3.7-in magnetic recording medium (disk) was obtained.

(Samples 2 to 11)

Samples 2 to 11 are the same as sample 1 except the quantity of isocetylstearate added to the magnetic coating A and the non-magnetic coating, listed in Table 5.

(Samples 12 to 15)

Samples 12 to 15 are the same as sample 1 except that isocetylstearate to be added to the magnetic coating A and the non-magnetic coating is changed to fatty acid ester listed in Table 5 and the described quantities are added.

(Sample 16)

Sample 16 is the same as sample 1 except that heat treatment after magnetic transfer is not performed.

(Sample 17)

Sample 17 is the same as sample 1 except that the temperature in the heat treatment after magnetic transfer is changed to 70° C.

(Sample 18)

Sample 18 is the same as sample 1 except that the magnetic coating A is changed to the magnetic coating B.

(Samples 19 to 28)

Samples 19 to 28 are the same as sample 1 except the quantity of isocetylstearate added to the magnetic coating A and the non-magnetic coating, listed in Table 5.

The kind and quantity of fatty acid ester in the magnetic layer and non-magnetic layer in the samples, heat treatment conditions, quality evaluation by the number of signal-transferred sheets, and durability are listed in Table 5. The number of signal-transferred sheets and running durability were evaluated by the following methods.

(Quality Evaluation by the Number of Signal-Transferred Sheets)

For each of the samples having a signal of line recording density 90 KFCI by the magnetic transfer device in the above-described method, a servo signal was continuously transferred. The magnetic transfer to the magnetic recording medium was stopped when the level of the reproduced servo signal was 2 dB lower than that of the signal at the starting point. At this time, the number of signal-transferred media was calculated.

(Durability under Cyclic Environment)

For each of the magnetic media of the obtained samples 1 to 28, a signal with a bit length of 0.3 µm was transferred by the generated master carrier. After magnetic transfer, a signal was reproduced from each of the magnetic media with an MR head of 0.5 µm in track width, using a RWA1001 type disk evaluation device (GUZIK) and a spin stand LS-90 (Kyodo Electronic Systems). The magnetic transfer to the magnetic recording medium was stopped when the level of the reproduced signal (TAA) was 2 dB lower than that of the signal at the starting point. At this time, the number of signal-transferred media was calculated.

TABLE 5

| Sample | Magnetic coating kind | Fatty acid ester in the magnetic layer | | Fatty acid ester in the non-magnetic layer | | Heat treatment conditions | Number of signal-transferred sheets (×10000) | Durability (hr) |
|---|---|---|---|---|---|---|---|---|
| | | Kind | Quantity [part(s)] | Kind | Quantity [part(s)] | | | |
| 1 | A | Isocetyl stearate | 1.5 | Isocetyl stearate | 6.0 | 55° C. 24 hr | 100< | 1500< |
| 2 | A | Isocetyl stearate | 1.0 | Isocetyl stearate | 6.0 | 55° C. 24 hr | 100< | 1500< |
| 3 | A | Isocetyl stearate | 0.5 | Isocetyl stearate | 6.0 | 55° C. 24 hr | 100< | 1500< |
| 4 | A | Isocetyl stearate | 0.0 | Isocetyl stearate | 6.0 | 55° C. 24 hr | 100< | 1500< |
| 5 | A | Isocetyl stearate | 2.0 | Isocetyl stearate | 6.0 | 55° C. 24 hr | 20 | 1500< |
| 6 | A | Isocetyl stearate | 1.5 | Isocetyl stearate | 10.0 | 55° C. 24 hr | 100< | 1500< |
| 7 | A | Isocetyl stearate | 1.5 | Isocetyl stearate | 15.0 | 55° C. 24 hr | 100< | 1500< |
| 8 | A | Isocetyl stearate | 1.5 | Isocetyl stearate | 20.0 | 55° C. 24 hr | 100< | 1500< |
| 9 | A | Isocetyl stearate | 1.5 | Isocetyl stearate | 25.0 | 55° C. 24 hr | 100< | 1500< |
| 10 | A | Isocetyl stearate | 1.5 | Isocetyl stearate | 1.0 | 55° C. 24 hr | 100< | 500 |
| 11 | A | Isocetyl stearate | 1.5 | Isocetyl stearate | 0.5 | 55° C. 24 hr | 100< | 100 |
| 12 | A | Butoxy stearate | 1.5 | Butoxy stearate | 6.0 | 55° C. 24 hr | 100< | 1500< |
| 13 | A | Butoxy stearate | 2.0 | Butoxy stearate | 6.0 | 55° C. 24 hr | 20 | 1500< |
| 14 | A | Pentaerythritol-tetrapentanoeto | 1.5 | Pentaerythritol-tetrapentanoeto | 6.0 | 55° C. 24 hr | 100< | 1500< |
| 15 | A | Pentaerythritol-tetrapentanoeto | 2.0 | Pentaerythritol-tetrapentanoeto | 6.0 | 55° C. 24 hr | 100< | 1500< |
| 16 | A | Isocetyl stearate | 1.5 | Isocetyl stearate | 6.0 | No | 100< | 1200 |
| 17 | A | Isocetyl stearate | 1.5 | Isocetyl stearate | 6.0 | 55° C. 24 hr | 100< | 1500< |

TABLE 5-continued

| Sample | Magnetic coating kind | Fatty acid ester in the magnetic layer | | Fatty acid ester in the non-magnetic layer | | Heat treatment conditions | Number of signal-transferred sheets (×10000) | Durability (hr) |
|---|---|---|---|---|---|---|---|---|
| | | Kind | Quantity [part(s)] | kind | Quantity [part(s)] | | | |
| 18 | B | Isocetyl stearate | 1.5 | Isocetyl stearate | 6.0  | 55° C. 24 hr | 100< | 1500< |
| 19 | B | Isocetyl stearate | 1.0 | Isocetyl stearate | 6.0  | 55° C. 24 hr | 100< | 1500< |
| 20 | B | Isocetyl stearate | 0.5 | Isocetyl stearate | 6.0  | 55° C. 24 hr | 100< | 1500< |
| 21 | B | Isocetyl stearate | 0.0 | Isocetyl stearate | 6.0  | 55° C. 24 hr | 100< | 1500< |
| 22 | B | Isocetyl stearate | 2.0 | Isocetyl stearate | 6.0  | 55° C. 24 hr | 10   | 1500< |
| 23 | B | Isocetyl stearate | 1.5 | Isocetyl stearate | 10.0 | 55° C. 24 hr | 100< | 1500< |
| 24 | B | Isocetyl stearate | 1.5 | Isocetyl stearate | 15.0 | 55° C. 24 hr | 100< | 1500< |
| 25 | B | Isocetyl stearate | 1.5 | Isocetyl stearate | 20.0 | 55° C. 24 hr | 100< | 1500< |
| 26 | B | Isocetyl stearate | 1.5 | Isocetyl stearate | 25.0 | 55° C. 24 hr | 100< | 1500< |
| 27 | B | Isocetyl stearate | 1.5 | Isocetyl stearate | 1.0  | 55° C. 24 hr | 100< | 500 |
| 28 | B | Isocetyl stearate | 1.5 | Isocetyl stearate | 0.5  | 55° C. 24 hr | 100< | 1000 |

According to Table 5, in the magnetic recording media (samples 1 to 4, 6–8, 12, 14, 16 to 21, and 23 to 25) of the present invention, in which the coating solution for the non-magnetic layer contains a first lubricant in a range of 1 to 20 wt % of the non-magnetic powder contained in the non-magnetic layer and the coating solution for the magnetic layer contains a second lubricant which is ¼ or less of the first lubricant in quantity, sufficient durability can be obtained. In addition, the long-term stability of the quantity of signals recorded on the magnetic recording medium of the present invention can be achieved.

On the other hand, in the samples 11 and 28 where the coating solution for the non-magnetic layer is 1 wt % or less of the non-magnetic powder contained in the non-magnetic layer, the quantity of a lubricant transferred from the non-magnetic layer to the magnetic layer is insufficient and therefore good durability cannot be obtained. In the samples (5, 9, 13, 15, 22, 26) where the coating solution for the magnetic layer contains a second lubricant which is ¼ or greater of the first lubricant in quantity, or the non-magnetic layer contains a large quantity of lubricant, a large quantity of lubricant is transferred to the master carrier during magnetic transfer. Because of this, the stability of the quantity of signals recorded on the magnetic recording medium is reduced. In the samples (10 and 27) in which the non-magnetic layer contains a small quantity of lubricant, sufficient durability cannot be obtained.

As set forth above, in the above-described fourth flexible magnetic recording medium, the first coating solution for forming the non-magnetic layer contains a first lubricant in a range of 1 to 20 wt % of non-magnetic powder contained in the non-magnetic layer. The second coating solution for forming the magnetic layer contains a second lubricant which is ¼ or less of the first lubricant in quantity. Therefore, the second lubricant can be prevented from being transferred to the master carrier, and the long-term stability of the quality of signals recorded on the magnetic recording medium can be achieved. In addition, the first and second lubricants are liquids at a temperature at which the magnetic transfer is performed. In the heat treatment after magnetic transfer, the lubricant moves gradually from the non-magnetic layer to the magnetic layer. As a result, it becomes possible to maintain the durability and flaw-resisting property of the magnetic recording medium.

While the present invention has been described with reference to the preferred embodiments thereof, the invention is not to be limited to the details given herein, but may be modified within the scope of the invention hereinafter claimed.

What is claimed is:

1. A method of fabricating a flexible magnetic recording medium, comprising the steps of:

stacking a magnetic layer on a non-magnetic layer on a substrate to form a stacked body, by coating a first coating solution on said substrate to form said non-magnetic layer, said first coating solution comprising a first lubricant, non-magnetic powder, and a binder, the amount of said first lubricant in said first coating solution being in a range of 1 to 20 wt %, based on the weight of non-magnetic powder, said first lubricant being a liquid at a temperature at which magnetic transfer is performed, and by coating a second coating solution to form said magnetic layer, said second coating solution comprising a second lubricant, magnetic powder, and a binder, the amount of said second lubricant being ¼ or less the amount of said first lubricant, said second lubricant being a liquid at said temperature;

bringing a master carrier, which has a land/groove pattern corresponding to data to be transferred, into intimate contact with said stacked body to transfer said data to said stacked body; and treating said stacked body with heat.

2. The method of fabricating a flexible magnetic recording medium as set forth in claim 1, wherein, said flexible magnetic recording medium comprises:

a non-magnetic substrate; and a non-magnetic layer and a magnetic layer formed on said substrate in the recited order;

wherein said magnetic layer includes polyurethane resin which contains in a range of 0.05 to 0.7 meq/g at least one kind of polar group selected from the group consisting of $—SO_3M$, $—OSO_3M$, $—P=O(OM)_2$, $—O—P=O(OM)_2$, and $—COOH$ (where M represents a hydrogen atom, alkali metals, or an ammonium salt);

and wherein the polyurethane resin content is 60 wt % or greater of the quantity of all resins in said magnetic layer.

3. The method of fabricating a flexible magnetic recording medium as set forth in claim 2, wherein said one kind of polar group is in a range of 0.1 to 0.5 meq/g.

4. method of fabricating a flexible magnetic recording medium as set forth in claim 2, wherein said one kind of polar group is in a range of 0.2 to 0.4 meq/g.

5. The method of fabricating a flexible magnetic recording medium as set forth in claim 2, wherein said polyurethane resin content is 70 wt % or greater of the quantity of all resins in said magnetic layer.

6. The method of fabricating a flexible magnetic recording medium as set forth in claim 2, wherein said polyurethane resin content is 100 wt % of the quantity of all resins in said magnetic layer.

* * * * *